United States Patent
Glover et al.

(10) Patent No.: US 11,731,095 B2
(45) Date of Patent: Aug. 22, 2023

(54) RESATURATION OF GAS INTO A LIQUID FEEDSTREAM

(71) Applicant: Crystaphase Products, Inc., Houston, TX (US)

(72) Inventors: John N. Glover, Houston, TX (US); Bradley Glover, Houston, TX (US); Austin Schneider, Humble, TX (US); Peter Gregory Ham, Houston, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 0 days.

(21) Appl. No.: 17/360,579

(22) Filed: Jun. 28, 2021

(65) Prior Publication Data

US 2021/0322943 A1 Oct. 21, 2021

Related U.S. Application Data

(63) Continuation of application No. 17/129,488, filed on Dec. 21, 2020, now Pat. No. 11,052,363.

(Continued)

(51) Int. Cl.
*B01J 8/02* (2006.01)

(52) U.S. Cl.
CPC .... *B01J 8/0278* (2013.01); *B01J 2208/00274* (2013.01); *B01J 2208/00283* (2013.01); *B01J 2208/025* (2013.01)

(58) Field of Classification Search
CPC ..... B01J 8/00; B01J 8/02; B01J 8/0278; B01J 8/0292; B01J 19/00; B01J 19/24; B01J 19/30–325; B01J 2208/00; B01J 2208/00008; B01J 2208/00017; B01J 2208/00106; B01J 2208/00265; B01J 2208/00274; B01J 2208/00283; B01J 2208/02; B01J 2208/023; B01J 2208/024;

(Continued)

(56) References Cited

U.S. PATENT DOCUMENTS

| 436,414 A | 9/1890 | Graham |
| 578,548 A | 3/1897 | Deruelle |

(Continued)

FOREIGN PATENT DOCUMENTS

| AU | 2004232690 | 11/2004 |
| AU | 2010203014 | 8/2010 |

(Continued)

OTHER PUBLICATIONS

Rauschert; Hiflow Rings Brochure; 5 pages. Filed Jun. 28, 2021.

(Continued)

*Primary Examiner* — Natasha E Young
(74) *Attorney, Agent, or Firm* — Greenberg Traurig LLP

(57) ABSTRACT

A method for enabling gas exchange and chemical reactions with one or more liquid streams contained in a reactive process vessel are provided. One or more exchange layers within the process vessel can be composed of both collector media and releaser media. The exchange layers allow elements to facilitate increased performance of vessel operations by promoting gas component mixing and diffusion. Improved rates of gas component exchange mean less coking and more gas components available for reaction.

4 Claims, 16 Drawing Sheets

Related U.S. Application Data

(60) Provisional application No. 62/951,681, filed on Dec. 20, 2019.

(58) Field of Classification Search
CPC .............. B01J 2208/025; B01J 2219/00; B01J 2219/24; B01J 2219/30; B01J 2219/302; B01J 2219/30207; B01J 2219/30211; B01J 2219/30215; B01J 2219/304; B01J 2219/30475; B01J 2219/31; B01J 2219/315; B01J 2219/32; B01J 2219/324; B01J 2219/32425; B01J 2219/32466; B01J 2219/33; B01J 2219/3306; B01J 2219/332; B01J 2219/3322; C10G 49/00; C10G 49/002

See application file for complete search history.

(56) References Cited

U.S. PATENT DOCUMENTS

| | | |
|---|---|---|
| 598,351 A | 2/1898 | Staub |
| 1,947,777 A | 2/1934 | Huff et al. |
| 2,000,078 A | 5/1935 | Haseltine |
| 2,006,078 A | 6/1935 | Pyzel |
| 2,055,162 A | 9/1936 | Friedrich |
| 2,153,599 A | 4/1939 | Thomas |
| 2,183,657 A | 12/1939 | Page |
| 2,198,861 A | 4/1940 | Chamberlain |
| 2,212,932 A | 8/1940 | Fairlie |
| 2,375,336 A | 5/1945 | Weitkamp |
| 2,408,164 A | 9/1946 | Foster |
| 2,439,021 A | 4/1948 | Quigg |
| 2,546,479 A | 3/1951 | Sodano |
| 2,571,958 A | 10/1951 | Slaughter et al. |
| 2,739,118 A | 3/1956 | Comte |
| 2,793,017 A | 5/1957 | Lake |
| 2,819,887 A | 1/1958 | Eversole et al. |
| 2,867,425 A | 1/1959 | Teller |
| 2,893,852 A | 7/1959 | Montgomery |
| 2,919,981 A | 1/1960 | Calva |
| 2,985,589 A | 5/1961 | Broughton et al. |
| 3,090,094 A | 5/1963 | Schwartzwalder et al. |
| 3,100,688 A | 8/1963 | Dess |
| 3,151,187 A | 9/1964 | Comte |
| 3,167,600 A | 1/1965 | Worman |
| 3,169,839 A | 2/1965 | Calva |
| 3,171,820 A | 3/1965 | Volz |
| 3,175,918 A | 3/1965 | McGahan |
| 3,208,833 A | 9/1965 | Carson |
| 3,214,247 A | 10/1965 | Broughton |
| 3,219,194 A | 11/1965 | Scwartzwalder |
| 3,232,589 A | 2/1966 | Eckert |
| 3,266,787 A | 8/1966 | Eckert |
| 3,329,271 A | 7/1967 | Ward |
| 3,361,839 A | 1/1968 | Lester |
| 3,410,057 A | 11/1968 | Lerner |
| 3,423,185 A | 1/1969 | Ballard et al. |
| 3,431,082 A | 3/1969 | Sellin |
| 3,487,112 A | 12/1969 | Paulik et al. |
| 3,489,529 A | 1/1970 | Dudych et al. |
| 3,498,755 A | 3/1970 | Borre |
| 3,506,248 A | 4/1970 | Starbuck et al. |
| 3,543,937 A | 12/1970 | Choun |
| 3,544,457 A | 12/1970 | Fredrick et al. |
| 3,562,800 A | 2/1971 | Carlson |
| 3,563,887 A | 2/1971 | Sommers |
| 3,618,910 A | 11/1971 | Arndt |
| 3,635,943 A | 1/1972 | Stewart |
| 3,657,864 A | 4/1972 | Davis, Jr. et al. |
| 3,685,971 A | 8/1972 | Carson |
| 3,706,812 A | 12/1972 | Derosset et al. |
| 3,717,670 A | 2/1973 | Schultz |
| 3,732,078 A | 5/1973 | Kassarjian |
| 3,752,453 A | 8/1973 | Doyne |
| 3,758,087 A | 9/1973 | Hoon, Jr. |
| 3,787,188 A | 1/1974 | Lyon |
| 3,787,189 A | 1/1974 | Lovell et al. |
| 3,789,989 A | 2/1974 | Carson |
| 3,796,657 A | 3/1974 | Protorius et al. |
| D232,236 S | 7/1974 | La Borde |
| 3,823,924 A | 7/1974 | Hoon, Jr. |
| 3,844,936 A | 10/1974 | Newson |
| 3,888,633 A | 6/1975 | Grosboll et al. |
| 3,892,583 A | 7/1975 | Winter et al. |
| 3,898,180 A | 8/1975 | Crooks et al. |
| 3,914,351 A | 10/1975 | McKeown |
| 3,924,807 A | 12/1975 | Morgan |
| 3,947,347 A | 3/1976 | Mitchell |
| 3,960,508 A | 6/1976 | Bessant et al. |
| 3,962,078 A | 6/1976 | Hirs |
| 3,992,282 A | 11/1976 | Grosboll et al. |
| D243,531 S | 3/1977 | Strigle, Jr. |
| 4,029,482 A | 6/1977 | Postma et al. |
| RE29,314 E | 7/1977 | Carlson et al. |
| RE29,315 E | 7/1977 | Carlson et al. |
| 4,033,727 A | 7/1977 | Vautrain |
| 4,041,113 A | 8/1977 | McKeown |
| 4,072,736 A | 2/1978 | Fattinger |
| 4,086,307 A | 4/1978 | Glaspie |
| 4,113,810 A | 9/1978 | Ikawa |
| 4,149,862 A | 4/1979 | Sewell, Sr. |
| 4,188,197 A | 2/1980 | Amberkar et al. |
| 4,197,205 A | 4/1980 | Hirs |
| 4,200,532 A | 4/1980 | Iwatani |
| 4,203,935 A | 5/1980 | Hackenjos |
| 4,251,239 A | 2/1981 | Clyde et al. |
| 4,275,019 A | 6/1981 | Bednarski |
| 4,285,910 A | 8/1981 | Kennedy, Jr. |
| 4,329,318 A | 5/1982 | Le Grouyellec et al. |
| 4,342,643 A | 8/1982 | Kyan |
| 4,374,020 A | 2/1983 | Trevino et al. |
| 4,378,292 A | 3/1983 | Haase |
| 4,380,529 A | 4/1983 | Gupta |
| 4,402,832 A | 9/1983 | Gerhold |
| 4,425,285 A | 1/1984 | Shimoi |
| 4,443,559 A | 4/1984 | Smith, Jr. |
| 4,457,849 A | 7/1984 | Heinze |
| 4,478,721 A | 10/1984 | Gerhold |
| 4,483,771 A | 11/1984 | Koch |
| 4,487,727 A | 12/1984 | Ballato, Jr. |
| 4,504,396 A | 3/1985 | Vardi et al. |
| 4,511,519 A | 4/1985 | Hsia |
| 4,519,960 A | 5/1985 | Kitterman |
| 4,522,767 A | 6/1985 | Billet |
| 4,537,731 A | 8/1985 | Billet |
| 4,550,012 A * | 10/1985 | Penick .................. C10G 49/26 422/106 |
| 4,554,114 A | 11/1985 | Glen |
| 4,568,595 A | 2/1986 | Morris |
| 4,569,821 A | 2/1986 | Duperray et al. |
| 4,579,647 A | 4/1986 | Smith |
| 4,581,299 A | 4/1986 | Jager |
| 4,615,796 A | 10/1986 | Kramer |
| 4,642,089 A | 2/1987 | Zupkas et al. |
| 4,642,397 A | 2/1987 | Zinnen et al. |
| 4,668,442 A | 5/1987 | Lang |
| 4,669,890 A | 6/1987 | Peyrot |
| 4,681,674 A | 7/1987 | Graven et al. |
| 4,691,031 A | 9/1987 | Suciu et al. |
| 4,708,852 A | 11/1987 | Helbling, Jr. et al. |
| 4,711,930 A | 12/1987 | Hoelderick et al. |
| 4,716,066 A | 12/1987 | Wymann |
| 4,719,090 A | 1/1988 | Masaki |
| 4,724,593 A | 2/1988 | Lang |
| 4,726,825 A | 2/1988 | Natale |
| 4,731,205 A | 3/1988 | McNulty |
| 4,775,460 A | 10/1988 | Reno |
| 4,788,040 A | 11/1988 | Campagnolo et al. |
| 4,798,676 A | 1/1989 | Matkovich |
| 4,810,685 A | 3/1989 | Twigg et al. |
| 4,830,736 A | 5/1989 | Hung et al. |
| 4,842,920 A | 6/1989 | Banai |
| 4,849,569 A | 7/1989 | Smith, Jr. |
| 4,859,642 A | 8/1989 | Hoelderick et al. |

(56) References Cited

U.S. PATENT DOCUMENTS

| | | |
|---|---|---|
| 4,863,606 A | 9/1989 | Ryall |
| 4,863,712 A | 9/1989 | Twigg et al. |
| 4,880,541 A | 11/1989 | Chiron et al. |
| 4,938,422 A | 7/1990 | Koves |
| 4,950,834 A | 8/1990 | Arganbright et al. |
| 4,954,251 A | 9/1990 | Barnes et al. |
| 4,968,651 A | 11/1990 | Crabtree |
| 4,971,771 A | 11/1990 | Stahl |
| 4,982,022 A | 1/1991 | Smith, Jr. |
| 4,985,211 A | 1/1991 | Akihama et al. |
| 5,013,426 A | 5/1991 | Dang Vu et al. |
| 5,017,542 A | 5/1991 | Matan et al. |
| 5,043,506 A | 8/1991 | Crossland |
| 5,055,627 A | 10/1991 | Smith, Jr. et al. |
| 5,104,546 A | 4/1992 | Filson et al. |
| 5,113,015 A | 5/1992 | Palmer et al. |
| 5,118,873 A | 6/1992 | Smith, Jr. |
| 5,122,276 A | 6/1992 | Loikits |
| 5,143,700 A | 9/1992 | Anguil |
| D331,793 S | 12/1992 | Erwes |
| 5,177,961 A | 1/1993 | Whittenberger |
| 5,188,772 A | 2/1993 | Yu |
| 5,189,001 A | 2/1993 | Johnson |
| D334,970 S | 4/1993 | Tominaga |
| D334,971 S | 4/1993 | Tominaga |
| 5,202,027 A | 4/1993 | Stuth |
| 5,202,097 A | 4/1993 | Poussin |
| 5,217,603 A | 6/1993 | Inoue et al. |
| 5,217,616 A | 6/1993 | Sanyal |
| 5,229,015 A | 7/1993 | Keep |
| 5,235,102 A | 8/1993 | Palmer et al. |
| 5,243,115 A | 9/1993 | Smith, Jr. et al. |
| 5,246,568 A | 9/1993 | Forbus et al. |
| 5,248,415 A | 9/1993 | Masuda |
| 5,248,836 A | 9/1993 | Bakshi et al. |
| D345,410 S | 3/1994 | Del Prete |
| 5,298,226 A | 3/1994 | Nowobilski |
| 5,304,423 A | 4/1994 | Niknafs et al. |
| 5,326,512 A | 7/1994 | Stillwagon et al. |
| 5,336,656 A | 8/1994 | Campbell |
| 5,368,722 A | 11/1994 | Bartholdy |
| 5,384,300 A | 1/1995 | Feeley et al. |
| 5,384,302 A | 1/1995 | Gerdes et al. |
| 5,399,535 A | 3/1995 | Whitman |
| 5,401,398 A | 3/1995 | McManus |
| 5,409,375 A | 4/1995 | Butcher |
| 5,411,681 A | 5/1995 | Seah |
| 5,446,223 A | 8/1995 | Smith, Jr. |
| 5,454,947 A | 10/1995 | Olapinski et al. |
| 5,476,978 A | 12/1995 | Smith, Jr. et al. |
| 5,510,056 A | 4/1996 | Jacobs et al. |
| 5,512,530 A | 4/1996 | Gerdes et al. |
| 5,523,503 A | 6/1996 | Funk et al. |
| 5,538,544 A | 7/1996 | Nowobilski et al. |
| 5,543,088 A | 8/1996 | Halbirt |
| 5,558,029 A | 9/1996 | Peake |
| 5,599,363 A | 2/1997 | Percy |
| 5,624,547 A | 4/1997 | Sudhakar et al. |
| D381,394 S | 7/1997 | Lex, Jr. et al. |
| 5,660,715 A | 8/1997 | Trimble et al. |
| 5,670,095 A | 9/1997 | Southam |
| 5,690,819 A | 11/1997 | Chianh |
| 5,707,513 A | 1/1998 | Jowett |
| 5,766,290 A | 6/1998 | Zievers et al. |
| 5,767,470 A | 6/1998 | Cha |
| 5,779,886 A | 7/1998 | Couture |
| 5,779,993 A | 7/1998 | Gentry |
| 5,785,851 A | 7/1998 | Morris et al. |
| 5,799,596 A | 9/1998 | Peake |
| 5,817,594 A | 10/1998 | McNamara et al. |
| 5,853,579 A | 12/1998 | Rummier et al. |
| 5,853,582 A | 12/1998 | Grangeon et al. |
| 5,866,736 A | 2/1999 | Chen |
| 5,873,998 A | 2/1999 | Grangeon et al. |
| 5,895,572 A | 4/1999 | Joulin et al. |
| 5,901,575 A | 5/1999 | Sunder |
| 5,910,241 A | 6/1999 | McNamara et al. |
| 5,943,969 A | 8/1999 | Peake |
| 5,972,214 A | 10/1999 | Callebert et al. |
| 5,980,739 A | 11/1999 | Jowett |
| 6,019,810 A | 2/2000 | Phillips |
| 6,024,871 A | 2/2000 | Harter et al. |
| 6,033,629 A | 3/2000 | Friederick et al. |
| 6,036,743 A | 3/2000 | Butcher et al. |
| 6,096,278 A | 8/2000 | Gary |
| 6,110,389 A | 8/2000 | Horowitz |
| 6,117,812 A | 9/2000 | Gao et al. |
| 6,153,094 A | 11/2000 | Jowett |
| 6,156,197 A | 12/2000 | Dessapt et al. |
| 6,242,661 B1 | 6/2001 | Podrebarac et al. |
| 6,258,900 B1 | 7/2001 | Glover et al. |
| 6,262,131 B1 | 7/2001 | Arcuri et al. |
| 6,284,022 B1 | 9/2001 | Sachweh et al. |
| 6,291,603 B1 | 9/2001 | Glover et al. |
| 6,315,972 B1 | 11/2001 | Mehdizadeh et al. |
| 6,352,579 B1 | 3/2002 | Hirata et al. |
| 6,371,452 B1 | 4/2002 | Shojaie |
| 6,379,032 B1 | 4/2002 | Sorensen |
| 6,387,534 B1 | 5/2002 | Niknafs |
| 6,402,959 B1 | 6/2002 | Dessapt et al. |
| 6,454,948 B2 | 9/2002 | Ferschneider et al. |
| D465,257 S | 11/2002 | Van Olst |
| 6,521,562 B1 | 2/2003 | Clem et al. |
| 6,524,849 B1 | 2/2003 | Adams |
| 6,583,329 B1 | 6/2003 | Podrebarac |
| 6,630,078 B2 | 10/2003 | Kourtakis et al. |
| 6,631,890 B1 | 10/2003 | Lau |
| 6,713,772 B2 | 3/2004 | Goodman et al. |
| 6,797,175 B2 | 9/2004 | Hotier |
| 6,811,147 B2 | 11/2004 | Lau |
| 6,835,224 B2 | 12/2004 | Cheng |
| 6,852,227 B1 | 2/2005 | Petrone |
| 6,890,878 B2 | 5/2005 | Moore |
| 7,014,175 B2 | 3/2006 | Honnell |
| 7,125,490 B2 | 10/2006 | Clendenning et al. |
| 7,255,917 B2 | 8/2007 | Rochlin et al. |
| 7,265,189 B2 | 9/2007 | Glover |
| 7,303,668 B2 | 12/2007 | Liao |
| 7,314,551 B2 | 1/2008 | Frey et al. |
| 7,390,403 B2 | 6/2008 | Siwak |
| 7,393,510 B2 | 7/2008 | Glover |
| 7,427,385 B2 | 9/2008 | Scheirer et al. |
| 7,488,413 B2 | 2/2009 | Badreddine |
| 7,527,671 B1 | 5/2009 | Ecker et al. |
| 7,544,288 B1 | 6/2009 | Cook |
| 7,637,485 B2 | 12/2009 | Honnell |
| 7,722,832 B2 | 5/2010 | Glover et al. |
| 7,741,502 B2 | 6/2010 | Lecocq et al. |
| 7,748,688 B2 | 7/2010 | Bessettes |
| 8,062,521 B2 | 11/2011 | Glover |
| 8,241,717 B1 | 8/2012 | Anderson |
| 8,282,890 B2 | 10/2012 | Niknafa et al. |
| 8,293,195 B2 | 10/2012 | Blanchard |
| 8,313,709 B2 | 11/2012 | Glover |
| D672,009 S | 12/2012 | Flournoy |
| 8,500,852 B2 | 8/2013 | Galbraith |
| 8,524,076 B2 | 9/2013 | Yang |
| 8,524,164 B2 | 9/2013 | Glover |
| 8,550,157 B2 | 10/2013 | O'Malley |
| 8,663,474 B2 | 3/2014 | Niazi |
| D705,499 S | 5/2014 | Zamarripa |
| 8,969,634 B2 | 3/2015 | Chiu et al. |
| 9,056,268 B2 | 6/2015 | Jones et al. |
| 9,101,863 B2 | 8/2015 | Glover |
| 9,205,392 B2 | 12/2015 | Byl et al. |
| 9,352,292 B2 | 5/2016 | Solantie et al. |
| D780,286 S | 2/2017 | Ausner |
| 9,732,774 B1 | 8/2017 | Glover |
| 10,054,140 B2 | 8/2018 | Glover et al. |
| 10,161,428 B2 | 12/2018 | Glover et al. |
| 10,421,067 B2 | 9/2019 | Glover |
| 10,421,068 B2 | 9/2019 | Glover |
| 10,449,531 B2 | 10/2019 | Glover |
| 10,500,581 B1 | 12/2019 | Glover |

(56) References Cited

U.S. PATENT DOCUMENTS

| | | |
|---|---|---|
| 10,525,456 B2 | 1/2020 | Glover |
| 10,543,483 B2 | 1/2020 | Glover |
| 10,557,486 B2 | 2/2020 | Glover et al. |
| 10,655,654 B2 | 5/2020 | Glover et al. |
| 10,662,986 B2 | 5/2020 | Glover |
| 10,738,806 B2 | 8/2020 | Glover |
| 10,744,426 B2 | 8/2020 | Glover |
| 10,864,465 B2 | 12/2020 | Boyd |
| 10,876,553 B2 | 12/2020 | Glover et al. |
| 10,920,807 B2 | 2/2021 | Glover et al. |
| 2001/0015336 A1 | 8/2001 | Glover |
| 2001/0042928 A1 | 11/2001 | Nagaoka |
| 2002/0059786 A1 | 5/2002 | Nagaoka |
| 2002/0092414 A1 | 7/2002 | Nagaoka |
| 2002/0146358 A1 | 10/2002 | Smith et al. |
| 2003/0125594 A1 | 7/2003 | Moore |
| 2003/0146524 A1 | 8/2003 | Niknafs |
| 2004/0031729 A1 | 2/2004 | Meier et al. |
| 2004/0043493 A1 | 3/2004 | Kobayashi |
| 2004/0084352 A1 | 5/2004 | Meier et al. |
| 2004/0192862 A1 | 9/2004 | Glover et al. |
| 2004/0225085 A1 | 11/2004 | Glover et al. |
| 2005/0211644 A1 | 9/2005 | Goldman |
| 2005/0240038 A1 | 10/2005 | Gobbel et al. |
| 2005/0255014 A1 | 11/2005 | Glover |
| 2006/0009648 A1 | 1/2006 | Gobbel et al. |
| 2006/0108274 A1 | 5/2006 | Frey et al. |
| 2006/0196826 A1 | 7/2006 | Glover |
| 2006/0251555 A1 | 11/2006 | Warner et al. |
| 2006/0275185 A1 | 12/2006 | Tonkovich et al. |
| 2007/0158277 A1 | 7/2007 | And et al. |
| 2007/0265357 A1 | 11/2007 | Iversen et al. |
| 2008/0044316 A1 | 2/2008 | Glover |
| 2008/0245743 A1 | 10/2008 | Dew |
| 2008/0257804 A1 | 10/2008 | Dew |
| 2008/0257805 A1 | 10/2008 | Dew |
| 2008/0296216 A1 | 12/2008 | Glover |
| 2009/0044702 A1 | 2/2009 | Adamek et al. |
| 2009/0146339 A1 | 6/2009 | Malone et al. |
| 2009/0211441 A1 | 8/2009 | Reyes et al. |
| 2009/0283479 A1 | 11/2009 | Warner et al. |
| 2010/0209315 A1 | 8/2010 | Niknafs |
| 2010/0243519 A1 | 9/2010 | Glover et al. |
| 2010/0243520 A1 | 9/2010 | Glover et al. |
| 2011/0160314 A1 | 6/2011 | Schrauwen |
| 2011/0200478 A1 | 8/2011 | Billiet |
| 2012/0211430 A1 | 8/2012 | Choi |
| 2012/0211438 A1 | 8/2012 | Glover |
| 2012/0237434 A1 | 9/2012 | Blanchard et al. |
| 2013/0178627 A1 | 7/2013 | Freitas, Jr. |
| 2013/0184461 A1 | 7/2013 | Freitas, Jr. |
| 2013/0306562 A1 | 11/2013 | Stifter et al. |
| 2014/0131902 A1 | 5/2014 | Huang et al. |
| 2014/0291224 A1 | 10/2014 | Fujita |
| 2015/0053627 A1 | 2/2015 | Silin et al. |
| 2015/0129512 A1 | 5/2015 | Thiyagarajan |
| 2015/0137393 A1 | 5/2015 | Huang et al. |
| 2015/0368565 A1 | 12/2015 | Schrauwen |
| 2016/0136603 A1 | 5/2016 | Parihar et al. |
| 2017/0189834 A1 | 7/2017 | Glover et al. |
| 2017/0234339 A1 | 8/2017 | Glover |
| 2018/0008952 A1 | 1/2018 | Glover |
| 2018/0023598 A1 | 1/2018 | Glover |
| 2018/0093207 A1 | 4/2018 | Glover et al. |
| 2018/0093930 A1 | 4/2018 | Freitas, Jr. |
| 2019/0046901 A1 | 2/2019 | Boyd |
| 2019/0048903 A1 | 2/2019 | Glover et al. |
| 2019/0177181 A1 | 6/2019 | St. Germain |
| 2019/0217283 A1 | 7/2019 | Glover et al. |
| 2019/0242412 A1 | 8/2019 | Glover et al. |
| 2019/0285098 A1 | 9/2019 | Glover et al. |
| 2019/0301498 A1 | 10/2019 | Glover |
| 2019/0301499 A1 | 10/2019 | Glover |
| 2019/0336957 A1 | 11/2019 | Glover |
| 2019/0351402 A1 | 11/2019 | Glover |
| 2019/0358620 A1 | 11/2019 | Glover |
| 2020/0149564 A1 | 5/2020 | Glover |
| 2020/0215524 A1 | 7/2020 | Glover |
| 2020/0376413 A1 | 12/2020 | Glover |
| 2020/0376414 A1 | 12/2020 | Glover |
| 2021/0018022 A1 | 1/2021 | Glover |

FOREIGN PATENT DOCUMENTS

| | | |
|---|---|---|
| CA | 2019928 | 12/1991 |
| CA | 2520071 | 4/2004 |
| CA | 2297113 | 2/2005 |
| CA | 2570527 | 12/2005 |
| CN | 202072546 | 12/2011 |
| CN | 102686308 | 9/2012 |
| CN | 203382593 | 1/2014 |
| DE | 585595 | 10/1933 |
| DE | 3539195 | 5/1986 |
| EP | 73150 | 10/1933 |
| EP | 260826 | 3/1988 |
| EP | 576096 | 12/1993 |
| EP | 539544 | 2/1995 |
| EP | 551041 | 5/1995 |
| EP | 719578 | 7/1996 |
| EP | 1001837 | 7/1998 |
| EP | 0899011 | 3/1999 |
| EP | 1606038 | 12/2005 |
| EP | 1755766 | 2/2007 |
| EP | 3040119 | 6/2016 |
| EP | 3397364 | 11/2018 |
| EP | 3414003 | 12/2018 |
| FR | 2480137 | 10/1981 |
| FR | 2851559 | 8/2004 |
| GB | 267877 | 1/1927 |
| GB | 374707 | 7/1932 |
| GB | 129616 | 6/1935 |
| GB | 933124 | 8/1963 |
| GB | 1097473 | 1/1968 |
| GB | 1442085 | 7/1976 |
| GB | 2108003 | 5/1983 |
| GB | 2149771 | 6/1985 |
| JP | 5237396 | 9/1977 |
| JP | S558819 | 1/1980 |
| JP | 5567309 | 5/1980 |
| JP | 5817818 | 2/1983 |
| JP | S58 (1983)-024308 | 2/1983 |
| JP | S61 (1986)-134300 | 6/1986 |
| JP | 61132097 | 8/1986 |
| JP | S61 (1986)-180818 | 8/1986 |
| JP | 62114643 | 5/1987 |
| JP | S63 (1988)-043632 | 3/1988 |
| JP | 4187297 | 7/1992 |
| JP | H06 (1994)-205922 | 7/1994 |
| JP | 1028876 | 2/1998 |
| JP | 1057821 | 3/1998 |
| JP | 11128734 | 5/1999 |
| JP | 2000-028876 | 1/2000 |
| JP | 2000-246048 | 9/2000 |
| JP | 2003-120257 | 4/2003 |
| JP | 2004-515432 | 5/2004 |
| JP | 2004-250554 | 9/2004 |
| JP | 2004-530746 | 10/2004 |
| JP | 2004-537406 | 12/2004 |
| JP | 2006-55749 | 3/2006 |
| JP | 2006-205068 | 8/2006 |
| JP | 2006-523139 | 10/2006 |
| JP | 2007-514529 | 6/2007 |
| JP | 2008-545527 | 12/2008 |
| JP | 5543817 | 7/2014 |
| JP | 2015-085208 | 5/2015 |
| JP | 2016-13748 | 8/2016 |
| JP | 2018-61955 | 4/2018 |
| JP | 6324420 | 5/2018 |
| KR | 10-2006-0016746 | 2/2006 |
| KR | B0747359 | 8/2007 |
| KR | 1221298 | 1/2013 |
| KR | B1417049 | 7/2014 |
| NL | 1009499 | 1/2000 |
| NZ | 542787 | 6/2009 |

(56) References Cited

FOREIGN PATENT DOCUMENTS

| | | |
|---|---|---|
| WO | 99/03561 | 1/1999 |
| WO | 2001/001536 | 1/2001 |
| WO | 2002/045838 | 6/2002 |
| WO | 2002/079346 | 10/2002 |
| WO | 2003/013725 | 2/2003 |
| WO | 2004/094039 | 11/2004 |
| WO | 2005/058472 | 6/2005 |
| WO | 2005/123221 | 12/2005 |
| WO | 2006/127671 | 11/2006 |
| WO | 2010/149908 | 12/2010 |
| WO | 2013/015415 | 1/2013 |
| WO | 2015/037730 | 3/2015 |
| WO | 2015/200513 | 12/2015 |
| WO | 2017/117492 | 7/2017 |
| WO | 2017/139597 | 8/2017 |
| WO | 2019/020705 | 1/2019 |
| ZA | 200508048 | 11/2006 |

OTHER PUBLICATIONS

Saxonburg Ceramics Incorporated; Product Material Specifications. Filed Jun. 28, 2021.
Schildhauer; Application of Film-Flow-Monoliths . . . , Technical Univesity Delft; Julianalaan 136, NL-2628 BL Delft; The Netherlands; 1 page; Oct. 29, 2003.
Scheffler, Michael; Cellular Ceramics: Structure, Manufacturing, Properties and Applications; Die Beutsche Bibliotheck; 2005; 5 pages; Germany.
Schlichting, Boundary-Layer Theory; McGraw-Hill; (Translation of Grenzschicht-Theorie, Translated by Dr. J. Kestin), 1979; pp. 230-234.
Selee Corporation; Product Brochure; 6 pages; 1997.
Selee Corporation Home Page; Internet; downloaded Nov. 14, 1996; 3 pages.
Selee Corporation; Ceramic Foam for Thermal/Kiln Furniture Applications; Ceramic Foam Kiln Furniture Phusical Property Data Sheet; Nov. 14, 1996; 2 pages.
Sinter Metals; High Porosity SIKA-R . . . IS; Porous Metals Filter Elements; 3 pages. Filed Jun. 28, 2021.
Sinter Metals; Tool List, Seamleass SILKA-Elements; 2 pages. Filed Jun. 28, 2021.
Sinter Metals; Hight Porosity Sintered Materials; p. 1-16. Filed Jun. 28, 2021.
Snyder Filtration; Nanofiltration Membranes; Retrieved Jun. 15, 2016 from: http://synderfiltration.com/nanofiltration/membranes/; 4 pages; Membrane Technology.
Strom et al.; Advanced Reticulated Ceramics; Hi-Tech Ceramics; p. 14-19. Filed Jun. 28, 2021.
Sulzer; Structured Packings for Separation and Reactive Distillation Brochure; pp. 2-27; 2002-2003.
Sweeting et al.; High Surface Reticulated Ceramics for Catalytic Applications; Mat., Res. Soc. Symp. Proc., vol. 549; pp. 17-23; 1999.
Sweeting et al.; Reticulated Ceramics for Catalyst Support Applications; Hi-Tech Ceramics, Inc.; Nov. 30, 1994; 12 pages.
Tan-Atichat and Nagib, "Interaction of free-stream turbulence with screens and grids: a balance between turbulence scales" J. Fluid Meeh (1982), vol. 114, pp. 501-528; Great Britain.
Wadley; Cellular Metals Manufacutring; Advanced Engineering Materials; 4; No. 10; pp. 726-733; 2002.
Woodward et al.; Akzo Chemicals' Guard Bed Technology; 16 pages; 1991.
U.S. Patent and Trademark Office; Non-Final Office Action, Issued in Connection with U.S. Appl. No. 11/893,190; dated Mar. 10, 2010; 6 pages; U.S.
Applicant; Amendment and Response, Filed in Connection with U.S. Appl. No. 11/893,190; dated Aug. 20, 2010; 4 pages; U.S.
U.S. Patent and Trademark Office; Final Office Action, Issued in Connection with U.S. Appl. No. 11/893,190; dated Nov. 3, 2010; 5 pages; U.S.
APPLICANT; Response to Final Office Action, Filed in Connection with U.S. Appl. No. 11/893,190; dated Jan. 3, 2011; 5 pages; U.S.
U.S. Patent and Trademark Office; Non-Final Office Action, Issued in Connection with U.S. Appl. No. 11/893,190; dated Jan. 19, 2011; 5 pages; U.S.
Applicant; Amendment and Response, Filed in Connection with U.S. Appl. No. 11/893,190; dated Jul. 19, 2011; 4 pages; U.S.
U.S. Patent and Trademark Office; Final Office Action, Issued in Connection with U.S. Appl. No. 11/893,190; dated Sep. 22, 2011; 6 pages; U.S.
Applicant; Amendment and Response, Filed in Connection with U.S. Appl. No. 11/893,190; dated Dec. 16, 2011; 5 pages; U.S.
U.S. Patent and Trademark Office; Non-Final Office Action, Issued in Connection with U.S. Appl. No. 11/893,190; dated Jan. 27, 2012; 7 pages; U.S.
U.S. Patent and Trademark Office; Non-Final Office Action, Issued in Connection with U.S. Appl. No. 11/893,190; dated Feb. 3, 2012; 7 pages; U.S.
Applicant; Amendment and Response, Filed in Connection with U.S. Appl. No. 11/893,190; dated Aug. 3, 2012; 6 pages; U.S.
U.S. Patent and Trademark Office; Final Office Action, Issued in Connection with U.S. Appl. No. 11/893,190; dated Oct. 23, 2012; 9 pages; U.S.
Applicant; Amendment and Response, Filed in Connection with U.S. Appl. No. 11/893,190; dated Dec. 24, 2012; 8 pages; U.S.
U.S. Patent and Trademark Office; Advisory Action Before the Filing of an Appeal Brief, Issued in Connection with U.S. Appl. No. 11/893,190; dated Jan. 11, 2013; 3 pages; U.S.
Applicant; Amendment and Response, Filed in Connection with U.S. Appl. No. 11/893,190; dated Feb. 25, 2013; 4 pages; U.S.
U.S. Patent and Trademark Office; Notice of Allowance and Fee(s) Due, Issued in Connection with U.S. Appl. No. 11/893,190; dated May 2, 2013; 8 pages; U.S.
U.S. Court of Appeals Federal Circuit; *Purdue Pharma L.P.* v. *Faulding Inc.*, 56 USPQ2d 1481 (CA FC 2000); Oct. 25, 2000; 11 pages.
Selected relevant excerpts from file history of U.S. Appl. No. 11/893,190, filed Aug. 15, 2007 and assigned to Applicant for present application.
Notice of Allowance for U.S. Appl. No. 10/867,015 (now U.S. Pat. No. 7,393,510, dated Jul. 1, 2008).
Observations submitted in connection to JP2017-226648; Jul. 17, 2018; 50 pages; Japan.
New Zealand Intellectual Property Office; Further Examination Report, issued in connection to application No. 743891; dated Jun. 24, 2019; 9 pages; New Zealand.
Japanese Patent Office; Observation, issued in connection to JP2018-541647;Jun. 19, 2019; 40 pages; Japan.
The Japan Petroleum Institute; Petroleum Refining Process; Kodansha Ltd.; May 20, 1998; 6 pages; Japan.
Chen, Xiaodong et al.; Improving the Strength of ZTA Foams with Different Strategies: Immersion Infiltration and Recoating; www.mdpi.com/journal/material;; May 30, 2017; 15 pages.
Intellectual Property Office of Singapore; Written Opinion, issued in connection to application No. 11201805367W; dated Aug. 16, 2019; 7 pages; Singapore.
Intellectual Property Office of Singapore; Written Opinion, issued in connection to application No. 11201805491X; dated Aug. 29, 2019; 6 pages; Singapore.
Intellectual Property India; Examination Report, issued in connection to application No. 201837023710; dated Aug. 28, 2019; 6 pages; India.
Government of Chile, Ministry of Economy, Promotion and Tourism; Examiner's Report and Search Report, issued in connection to application No. 201801799; dated Aug. 9, 2019; 14 pages; Chile.
Canadian Intellectual Property Office; Official Action and Examination Search Report, issued in connection with CA3009845; dated Aug. 28, 2019; 4 pages; Canada.
Saint-Gobain Norpro; Denstone ® Deltrap ® Support Media; 6 pages; printed Oct. 1, 2019; https://www.norpro.saint-gobain.com/support-media/denstone-deltap.

(56) References Cited

OTHER PUBLICATIONS

Saint-Gobain Norpro; Tools Help Optimize Selection of Denstone ® Bed Support Media; Apr. 4, 2019; 4 pages; https://www.norpro.saint-gobain.com/articles/tools-help-optimize-selection-denstone-bed-support-media-article.
European Patent Office; PCT International Search Report, issued in connection to PCT/US2020/066445 dated Mar. 19, 2021; 5 pages; Europe.
European Patent Office; PCT Written Opinon of the International Searching Autothority, issued in connection to PCT/US2020/066445; dated Mar. 19, 2021; 8 pages; Europe.
Australian Government, IP Australia, Examination Report No. 1 for Standard Patent Application, Issued in connection to AU2017217834; 3 pages; dated Nov. 14, 2018; Australia.
Australian Government, IP Australia, Examination Report No. 1 for Standard Patent Application, Issued in connection to AU2016381170; 3 pages; dated Apr. 10, 2019; Australia.
Brazilian National Institute of Industrial Property; Technical Examination Report, issued in connection to PI0613275-8; dated Feb. 25, 2016; 16 pages; Brazil.
Canadian Intellectual Property Office; Official Action, issued in connection with CA3009825; dated Jun. 18, 2019; 4 pages; Canada.
Chilean Patent and Trademark Office; Abstract Publication of CL2131-2018; Sep. 28, 2018; 1 page; Chile.
European Patent Office; PCT International Search Report, Issued in Connection to PCT/US2005/020712; dated Mar. 3, 2006; 2 pages; Europe.
European Patent Office; PCT International Search Report, Issued in Connection to PCT/US2004/006366; dated Oct. 20, 2004; 2 pages; Europe.
European Patent Office; PCT International Search Report, Issued in Connection to PCT/US2006/019854; dated Jan. 17, 2007; 2 pages; Europe.
European Patent Office; PCT Written Opinion of the International Searching Authority, Issued in Connection to PCT/US2006/019854; dated Jan. 17, 2007; 5 pages; Europe.
European Patent Office; PCT International Search Report, Issued in Connection to PCT/US98/14768; dated Nov. 26, 1998; 3 pages; Europe.
European Patent Office; PCT International Search Report, Issued in Connection to PCT/US2016/069396; dated Mar. 31, 2017; 3 pages; Europe.
European Patent Office; PCT Written Opinion of the International Searching Authority, Issued in Connection to PCT/US2016/069396; dated Mar. 31, 2017; 6 pages; Europe.
European Patent Office; PCT International Search Report, Issued in Connection to PCT/US2017/017398; 5 pages; Europe. Filed Jun. 28, 2021.
European Patent Office; PCT Written Opinion of the International Searching Authority, Issued in Connection to PCT/US2017/017398; 9 pages; Europe. Filed Jun. 28, 2021.
European Patent Office; Communicaiton and Search Report, Issued in Connection to EP15192642.5; dated Jun. 2, 2016; 7 pages; Europe.
European Patent Office; Communicaiton Pursuant to Rules 161(1) and 162 EPC, issued in connection to EP17706648.7; dated Sep. 19, 2018; 3 pages; Europe.
European Patent Office; Communicaiton Pursuant to Rules 161(1) and 162 EPC, issued in connection to EP16834162.6; dated Aug. 8, 2018; 3 pages; Europe.
European Patent Office; Communication Pursuant to Article 94(3) EPC, issued in connection to EP15192642.5; dated Mar. 5, 2013, 2019; 5 pages; Europe.
European Patent Office; Communication Pursuant to Article 94(3) EPC, Issued in Connection to EP04716499.1; dated May 9, 2016; 4 pages; Europe.
European Patent Office; Communication pursuant to Article 94(3) EPC, issued in connection to EP04716499.1; dated Mar. 10, 2017; 5 pages; Europe.
European Patent Office; Communication Pursuant to Article 94(3) EPC, Issued in Connection to EP04716499.1; dated Mar. 15, 2013; 4 pages; Europe.
European Patent Office; Summons to attend oral proceedings pursuant to Rule 115(1) EPC, issued in connection to EP04716499.1; dated Feb. 12, 2018; 6 pages; Europe.
European Patent Office; Extended European Search Report, issued in connection to EP18201370.6; dated Apr. 9, 2019; 6 pages; Europe.
European Patent Office; Extended European Search Report, issued in connection to EP15192642.5; dated Jun. 2, 2016; 6 pages; Europe.
European Patent Office; Communication Pursuant to Article 94(3) EPC, issued in connection to EP98934597.0; dated Mar. 16, 2009; 3 pages; Europe.
European Patent Office; Communication Pursuant to Article 94(3) EPC, issued in connection to EP98934597.0; dated Jun. 21, 2006; 4 pages; Europe.
European Patent Office; Communication Pursuant to Article 96(2) EPC, issued in connection to EP98934597.0; dated Sep. 10, 2004; 4 pages; Europe.
European Patent Office; Communication Pursuant to Article 96(2) EPC, issued in connection to EP98934597.0; dated Dec. 11, 2002; 3 pages; Europe.
European Patent Office; Communication Pursuant to Article 96(2) EPC, issued in connection to EP98934597.0; dated Oct. 8, 2001; 2 pages; Europe.
European Patent Office; Communication Pursuant to Article 96(2) EPC, issued in connection to EP05760680.8; dated Jan. 28, 2009; 6 pages; Europe.
European Patent Office; Communication Pursuant to Article 96(2) EPC, issued in connection to EP05760680.8; dated Jul. 5, 2010; 5 pages; Europe.
ESPACENET; English Translation of CN203382593U; Oct. 4, 2016; 7 pages; Europe.
ESPACENET; English Translation of CN202072546U; Oct. 4, 2016; 11 pages; Europe.
ESPACENET; English Translation of FR2851559A1; Oct. 4, 2016; 9 pages; Europe.
ESPACENET; English Translation of WO2010149908A1; Oct. 4, 2016; 23 pages; Europe.
The International Bureau OT WIPO; PCT International Preliminary Report on Patentability, Issued in Connection to PCT/2005/020712; dated Dec. 14, 2006; 5 pages; Switzerland.
The International Bureau OT WIPO; PCT International Preliminary Report on Patentability, Issued in Connection to PCT/2004/006366; dated Oct. 1, 2005; 5 pages; Switzerland.
Japanese Patent Office; Notice of Reasons for Rejection, issued in connection to JP2010-246536; dated Sep. 7, 2012; 8 pages; Japan.
Japan Patent Office; Notice of Reasons for Rejection, issued in connection with JP2010-246536; dated Nov. 12, 2013; 6 pages; Japan.
Japan Patent Office; Final Rejection, issued in connection with JP2010-246536; dated Jun. 25, 2014; 2 pages; Japan.
Japan Patent Office; Decision to Dismiss Amendment, issued in connection to JP2010-246536; Jun. 25, 2014; 3 pages; Japan.
Japanese Patent Office; Notice of Reasons for Rejection of Japanese Patent Application 2016-017373; Dec. 7, 2016; 11 pages; Japan.
Japanese Patent Office; Decision of Dismissal of Amendment, issued in connection to JP2014-217190; 4 pages, Japan. Filed Jun. 28, 2021.
Japanese Patent Office; Final Rejection, issued in connection to JP2014-217190; 3 pages; Japan. Filed Jun. 28, 2021.
Japanese Patent Office; Notice of Reasons for Rejection, issued in connection to JP2014-217190; dated Aug. 31, 2016; 6 pages; Japan.
Japanese Patent Office; Notice of Reasons for Rejection, issued in connection to JP2014-217190; dated Sep. 30, 2015; 8 pages; Japan.
Japanese Patent Office; Observation, issued in connection to JP2017-226648; dated Jul. 17, 2018; 50 pages; Japan.
Chilean Patent and Trademark Office; Examiner Report, issued in connection to application No. 2131-2018; 17 pages; dated Aug. 29, 2019; Chile.

(56) References Cited

OTHER PUBLICATIONS

Chilean Patent and Trademark Office; Search Report, issued in connection to application No. 2131-2018; 3 pages; dated Aug. 29, 2019; Chile.
Japanese Patent Office; Notice of Reasons for Rejection, issued in connection to JP2018-541647; dated Aug. 28, 2019; 14 pages; Japan.
Korean Intellectual Property Office; Notification of Provisional Rejection, issued in connection to application No. 10-2018-7021988; dated Oct. 22, 2019; 7 pages; Korea.
European Patent Office; Communication Pursuant to Article 94(3) EPC, issued in connection to EP17706648.7; dated Oct. 24, 2019; 7 pages; Europe.
Korean Intellectual Property Office; Notification of Provisional Rejection, issued in connection to application No. 10-2018-7026274; dated Oct. 22, 2019; 14 pages; Korea.
Australian Government, IP Australia, Examination Report No. 2 for Standard Patent Application, Issued in connection to AU2016381170; 3 pages; dated Nov. 8, 2019; Australia.
Japanese Patent Office; Final Rejection, issued in connection to application No. 2017-226648; dated Feb. 26, 2020; 6 pages; Japan.
Chilean Patent and Trademark Office; Examiner Report No. 2., issued in connection to application No. 1799-2018; dated Jan. 24, 2020; 12 pages; Chile.
European Patent Office; Communication pursuant to Article 94(3) EPC, issued in connection to EP16834162.6; dated Feb. 4, 2020; 7 pages; Europe.
Japanese Patent Office; Office Action, issued in connection to application No. 2018-553847; dated Feb. 26, 2020; 3 pages; Japan.
Intellectual Property Office of Singapore; Invitation to Respond to Written Opinion, issued in connection with application No. 11201805491X; dated Mar. 3, 2020; 6 pages; Singapore.
Indian Patent Office; Examination Report, issued in connection to application No. 201837023720; dated Jan. 23, 2020; 6 pages; India.
Intellectual Property Office of Singapore; Invitation to Respond to Written Opinion, issued in connection with application No. 11201805367W; dated Mar. 2, 2020; 34 pages; Singapore.
National Institute of Industrial Property of Brazil; Office Action, issued in connection to application No. BR112018013488-0; dated Feb. 2, 2020; 4 pages; Brazil.
Canadian Intellectual Property Office; Office Action, issued in connection to application No. 3009825; dated Apr. 22, 2020; 3 pages; Canada.
Japanese Patent Office; Statement of Submission of Publication by third part, filed in connection to application No. 2019-140168; Apr. 21, 2020; 1 page; Japan.
Kabe, Toshiaki; Hydrotreating—Science and Technology; Oct. 20, 2000; pp. 367-379; IPC KK.
Canadian Intellectual Property Office; Examiner Report, issued in connection to application No. CA3009845; dated May 20, 2020; 3 pages; Canada.
Japanese Patent Office; Statement of Submission of Publication by third part, filed in connection to application No. 2018-541647; Jun. 25, 2020; 3 page; Japan.
Korean Intellectual Property Office; Office Action, issued in connection to patent application No. 10-2020-7011514; dated Jul. 20, 2020; 11 pages; Korea.
European Patent Office; Communication Pursuant to Article 94(3)EPC, issued in connection to application No. 182013703.6; dated Jul. 27, 2020; 5 pages; Europe.
Japanese Patent Office; Office Action, issued in connection to application No. 2019-140168; dated Sep. 2, 2020; 9 pages; Japan.
European Patent Office; Communication Pursuant to Article 94(3) EPC, issued in conneciton to application No. EP15192642.5; dated Sep. 10, 2020; 5 pages; Europe.
Intellectual Property Office of Singapore; Invitation to Respond to Written Opinion, issued in connection to application No. 11201805491X; dated Aug. 18, 2020; 6 pages; Singapore.
Japanese Patent Office; Final Rejection, issued in connection to application No. 2018-541647; dated Jul. 22, 2020; 4 pages; Japan.

Korean Intellectual Property Office; Second Notificaiton of Provisional Rejection, issued in connection to application No. 10-2018-7021988; dated Oct. 26, 2020; 12 pages; Korea.
Japanese Patent Office; Final Office Action, issued in connection to application No. 2018-553847; dated Jan. 6, 2021; 11 pages; Japan.
Canadian Patent Office; Office Action, issued in connection to application No. 3009825; dated Feb. 17, 2021; 3 pages; Canada.
Korean Intellectual Property Office; Notice of First Refusal Ruling, issued in connection to application No. 10-2018-7021988; dated Mar. 26, 2021; 8 pages; Korea.
Brazilian National Institute of Industrial Property; Technical Examination Report, issued in connection to PI0613275-8 ; dated Feb. 24, 2021; 18 pages; Brazil.
Japanese Patent Office; Final Office Action, issued in connection to application No. 2017-226648; dated Feb. 24, 2021; 29 pages; Japan.
Nippon Ketjen Co., Ltd; Summary of Invalidation Reason, filed in connection to Korean patetn No. 10-1417049; Mar. 15, 2021; 35 pages; Korea.
Intellectual Property Corporation of Malaysia; Substantive Examination Adverse Report (Section 30(1) / 30(2)), issued in connection with application No. PI2018702533; dated Apr. 27, 2021; 3 pages; Malaysia.
Japanese Patent Office; Notice of Reasons for Rejection, issued in connection to JP2017-226648; dated Jan. 31, 2019; 10 pages; Japan.
Japanese Patent Office; Notice of Resons for Rejection, issued in connection to JP2018-553847; dated May 29, 2019; 10 pages; Japan.
New Zealand Intellectual Property Office; First Examination Report, issued in connection to application No. 743895; dated Jan. 31, 2019; 5 pages; New Zealand.
New Zealand Intellectual Property Office; First Examination Report, issued in connection to application No. 743891; dated Nov. 6, 2018; 10 pages; New Zealand.
Behrens et al.; Performance of a Monolith-like Structured; Chem. Biochem. Eng. Q. 15 (2); pp. 49-57; 2001.
Beihai Huihuang Chemical Packing Co. Lts., http://77520.pub.diysite.eom/sc.deliver/main/0-4-5/4/0-ma.html?siteid=77520; 10 pages; May 5, 2003.
BT-750 3/4 D Ceramic Wagon Wheel Unit; 1 page. Filed on Jun. 28, 2021.
Butcher; Reticulated Ceramic Foam as a Catalyst Support; Seminar for CatCon '98; Jun. 3-5, 1998; Ohio.
Ceramic Industry Cover page; and Table of Contents; vol. 147, No. 3; 2 pages; Mar. 1997.
Christy Refractories Company; Prox-Svers Catalyst Support Media; 4/95.
Colombo; Porous Ceramics and Ceramic Components from Preceramic Polymers; http://www.matse.psu.edu/people/faculty/colombo.html; 5 pages. Filed on Jun. 28, 2021.
Criterion; Top Bed Catalysts and Support; 1 page. Filed on Jun. 28, 2021.
Criterion; Technical Bulletin: Loading Your Hydrotreating Reactor for Maximum Activity; Criterion Catalysts & Technologies; 3 pages; 2008.
Crystaphase Products, Inc.; Product Data Information: Ceramic Support—Recycled Silica Alumina; 1 page. Filed on Jun. 28, 2021.
Fay; A Three-Point Generalization of the Ellipse; International Journal of Mathematical Education in Science and Technology; Jan. 2002; vol. 33, Issue 1; pp. 111-123.
Foseco Home Page; Internet; p. 1-3; Feb. 21, 1997.
Fulton; CE Refresher: Catalyst Engineering, Part 2, Selecting the Catalyst Configuaration; May 1986' Chemical engineering; pp. 97-101.
Gibson; Cellular Solids, MRS Bulletin; www.mrs.org/publications/bulleting; pp. 270-274; Apr. 2003.
Gibson et al.; Cellular Solids: Structure and Properties; Second Edition, Cambridge Solid State Science Series, Cambridge University Press; 71 pages; 1997.
GKN Sinter Metals; Design Ideas and Application—Porous Discs; 4 pages. Filed on Jun. 28, 2021.
Green et al.; Cellular Ceramics: Intriguing Structures, Novel Properties, and Innovative Applications; www.mrs.org/publications/bulletin; pp. 296-300; Apr. 2003.

(56) References Cited

OTHER PUBLICATIONS

Haldor Topsoe, Inc.; Material Safety Data Sheet Inert Topping TK-10; p. 1-4; 1992.
Haldor Topsoe; Topsoe Graded Bed Solutions; 3 pages. Filed on Jun. 28, 2021.
Hickman et al.; Production of Syngas by Direct Catalytic Ocidation of Methane; Science; vol. 256; p. 343-346; Jan. 15, 1993.
Hi-Tech Ceramics; Reticel, Designing the Future with Advanced Reticulated Ceramics; Product Brochure; 6 pages. Filed on Jun. 28, 2021.
Hung et al.; Translation of DE3539195, Hydroprocessing Catalyzer with Specific Geometric Shate; 23 pages; May 2000.
Ivars Peterson's MathLand; Beyond the Ellipse; The Mathematical Association of America; Sep. 2, 1996; 3 pages.
Kim et al.; Effect of Inert Filler Addition on Pore Size and Porosity of Closed-Cell Silicon Oxycarbide Foams; Journal of Materials Science 39; pp. 3513-3515; 2004.
Koch; Reactor Inernals by Koch, Your Way; 1 page. Filed on Jun. 28, 2021.
Loehrke and Nagib, Agard Report No. R-598 Experiments on Management of Free-stream Turbulence 1972.
Materials 2017, 10(7), 735; "Improving the Strength of ZTA Foams with Different Strategies: Immersion Infiltration and Recoating;" https://doi.org/10.3390/ma10070735; 15 pages; Jul. 1, 2017.
Mills; Ceramic Technology Provides Refining Solutions, Saint-Gobain Norpro; pp. 1-17; 2003.
Mills; Ceramic Guard Bed Materials; Norton Chemical Process Products Corporation; Jun. 3-5, 1998; 24 pages; US.
Natural / Food Foams; 8 pages. Filed on Jun. 28, 2021.
Norton Chemical Process Products Corporation, MacroTrap Guard Bed Media; 6 pages: 1998.
Norton Chemical Process Products Copr.; Denstone Inert Catalyst Bed Supports; 10 pages; 1992; Ohio.
NPRA Q&A Session on Refining and Petrochemical Technology; Section B. Hydrotreating; p. 85-101; 1990.
NPRA Q&A Session on Refining and Petrochemical Technology: Section B. Hydrotreating; p. 98-118; 1991.
NPRA Q&A Session on Refining and Petrochemical Technology: Section B. Hydrotreating; p. 104-135; 1992.
NPRA Q&A Session on Refining and Petrochemical Technology: Section B. Hydrotreating; p. 94-112; 1993.
NPRA Q&A Session on Refining and Petrochemical Technology: Section B. Hydrotreating; p. 98-139; 1994.
NPRA Q&A Session on Refining and Petrochemical Technology: Section B. Hydrotreating; p. 96-123; 1995.
NPRA Q&A Session on Refining and Petrochemical Technology: Section B. Hydrotreating; p. 131-160; 1996.
Dlujic et al.; Distillation Column Internals/Configurations for Press . . . , Chem. Biochem, Eng. Q. 17 (4); pp. 301-309; 2003.
Perry's Chemical Engineers' Handbook, 7th Ed., McGraw-Hill, 1997, pp. 6-33-6-34.
PetroWare, Incl; 86 Catalyst Support Media; Premium Quality from Beginning to End; 21 pages; Ohio. Filed on Jun. 28, 2021.
Petrotech, vol. 4, pp. 382-383; 1981.
Product Bulletin: Criterion 855 MD "Medallions" Inert Catalyst Support; Aug. 1998; 2 pages.
Queheillalt et al.; Synthesis of Stochastic Open Cell Ni-Based Foams; Scripta Materialia 50; pp. 313-317; 2004.
Rashmi Narayan; Particle Capture from Non-Aqueous Media on Packed Beds; Dept. of Chemical and Materials Engineering; 116 pages; Fall 1996; Edmonton, Alberta.

* cited by examiner

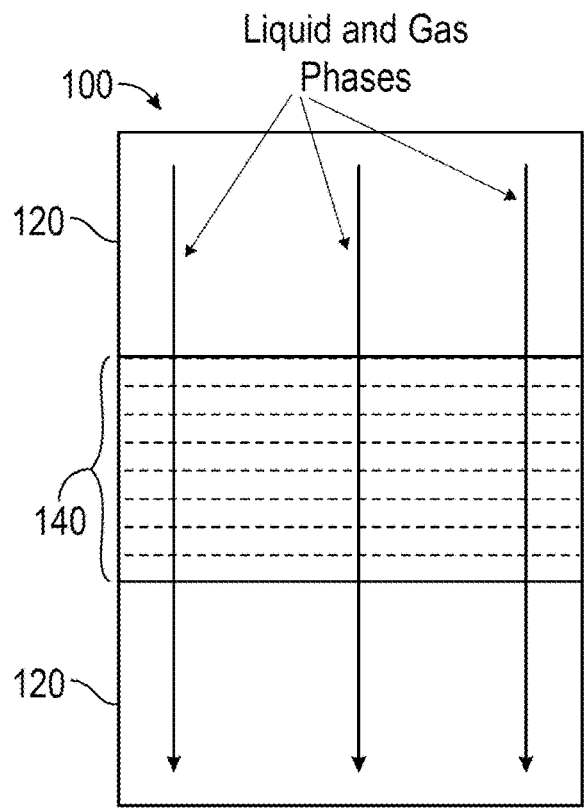
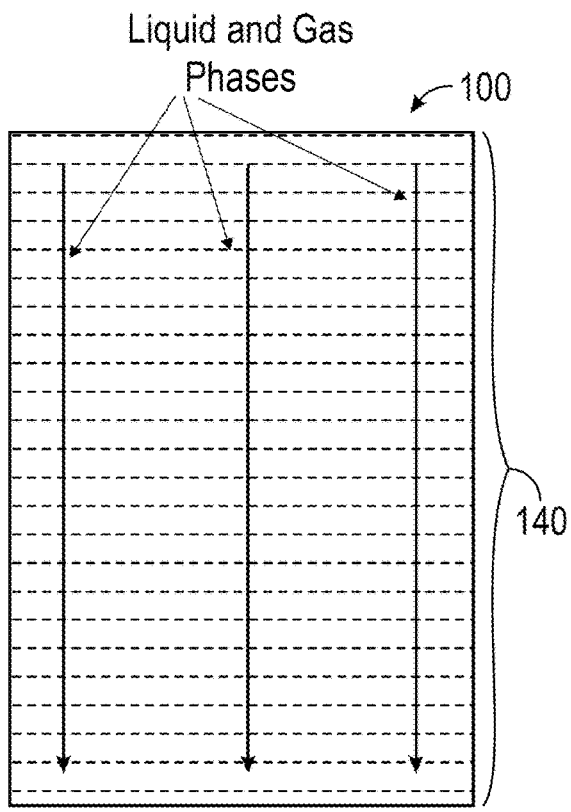
FIG. 3A    FIG. 3B
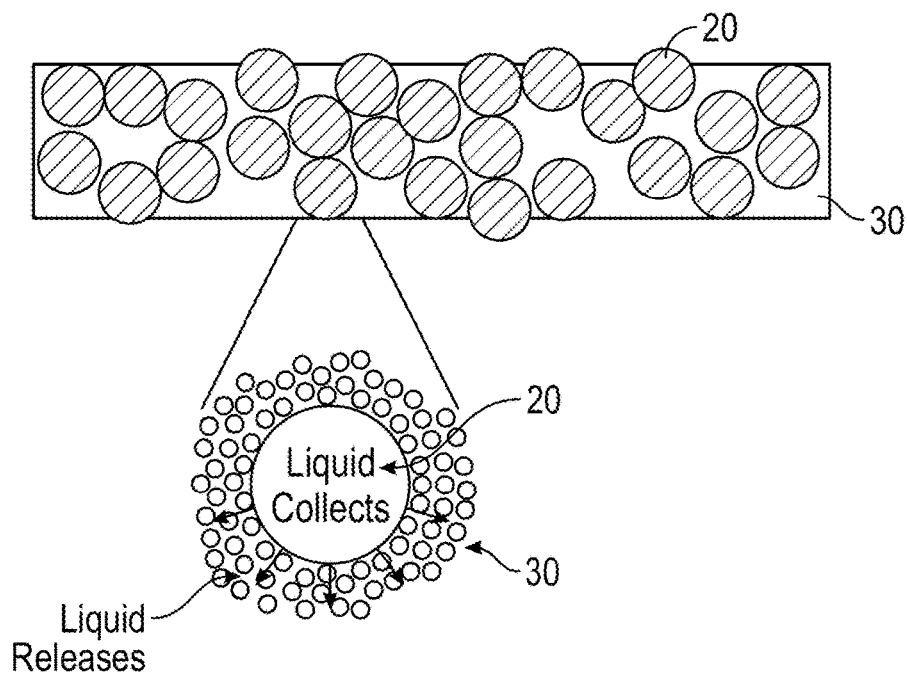
FIG. 4

RESATURATION OF GAS INTO A LIQUID FEEDSTREAM

RELATED APPLICATIONS

This application is a continuation application and claims the benefit, and priority benefit, of U.S. patent application Ser. No. 17/129,488, now U.S. Pat. No. 11,052,363, filed Dec. 21, 2020, which claims the benefit, and priority benefit, of U.S. Provisional Patent Application Ser. No. 62/951,681, filed Dec. 20, 2019, the disclosure and contents of which are incorporated by reference herein in their entirety.

BACKGROUND OF THE INVENTION

Field of the Invention

The presently disclosed subject matter relates generally to reactive process vessels, and more specifically, to enabling the gas exchange and chemical reactions with one or more liquid streams or phases contained in reactive process vessels.

Description of the Prior Art

Process vessels in the field are often vertical cylindrical constructions with fluid streams or phases which enter, pass through and exit such vessels. Industrial vessels are 6 inches to over 20 feet in diameter and 2 to over 100 feet high. The vessels containing reactive systems can be used to promote chemical reactions.

Contained within many conventional vessels are different phases of materials. A solid phase includes one or more beds of solid elements. Other phases contained in vessels include fluid phases including one or more liquid phases and one or more gas phases. Multiple fluid phases can be contained in a fluid stream. The state of the phases can depend on their operating conditions. Typical liquid throughput to a vessel is measured in barrels per day. Typical gas volumes are measured in standard cubic feet (SCF). The throughput of gas to a vessel is typically measured in standard cubic feet per barrel of liquid feed.

Improvements in this field are needed.

SUMMARY

In accordance with the presently disclosed subject matter, various illustrative embodiments of a method for enabling the gas exchange and chemical reactions with one or more liquid streams contained in a reactive process vessel are provided herein.

In certain illustrative embodiments, a method of treating a reactant-lean liquid phase in a process vessel is provided. The reactant-lean liquid phase and a gas phase can be passed co-currently through an exchange layer in the process vessel. The gas phase comprises a reactant. At least some of the reactant from the gas phase can be diffused into the reactant-lean liquid phase in the exchange layer to form a reactant-rich liquid phase. The exchange layer can include a plurality of collector media and a plurality of releaser media, and the collector media can include porous solid materials capable of collecting the reactant-lean liquid phase within the collector media. The releaser media can include solid materials having a thin film formed on an outer surface thereof that is capable of facilitating contact and diffusion between the reactant-lean liquid phase and the gas phase. The thin film can be formed on the releaser media during processing as a result of liquid released from the collected liquid phase. The process vessel can be a trickle bed reactor. In certain aspects, the reactant-rich liquid phase can be passed through a bed of porous solid elements following the exchange layer. The porous solid elements can include at least one of catalysts, sorbents and reactants. A treating process can be performed in the process vessel to remove an undesired species from the liquid phase. The treating process can include at least one of hydro-desulfurization, hydro-denitrogenation, hydro-cracking, hydrogenation, hydro-dearomatization, hydro-deoxygenation, hydro-demetallization, and isomerization. The undesired species can include at least one of sulfur, nitrogen, oxygen, aromatics, olefins, nickel, vanadium, iron, silicon or arsenic. The reactant-rich liquid phase can include at least one of naphtha, gasoline, kerosene, jet, diesel, gas oils, vegetable oils, animal tallow, and liquid water. The reactant diffused from the gas stream into the reactant-lean liquid stream can include at least one of methane, butane, propane, butalene, propylene, hydrogen, ammonia, hydrogen sulfide, carbon dioxide, carbon monoxide, sulfur oxides, nitrogen oxides, water gas, oxygen, and nitrogen. The releaser media can include at least one of catalysts, sorbents and reactants. In certain aspects, the size of the releaser media can be no more than one-fourth the size of the collector media. In certain aspects, each of the collector media in the exchange layer can have at least twenty contact points on its outer surface that are contacted by releaser media.

In certain illustrative embodiments, a method of treating a product-rich liquid phase in a process vessel is also provided. The product-rich liquid phase and a gas phase can be passed co-currently through an exchange layer in the process vessel, wherein the product-rich liquid phase can include a reaction product. At least some of the reaction product from the product-rich liquid phase can be diffused into the gas in the exchange layer to form a product-lean liquid phase. The exchange layer can include a plurality of collector media and a plurality of releaser media, and wherein the collector media comprise porous solid materials capable of collecting the product-rich liquid phase within the collector media. The releaser media can include solid materials that are capable of facilitating contact and diffusion between the product-rich liquid phase and the gas phase. In certain aspects, the size of the releaser media can be no more than one-fourth the size of the collector media. In certain aspects, each of the collector media in the exchange layer can have at least twenty contact points on its outer surface that are contacted by releaser media. The process vessel can be a trickle bed reactor. In certain aspects, the product-lean liquid phase can be passed through a bed of porous solid elements following the exchange layer. The porous solid elements can include at least one of catalysts, sorbents and reactants. A treating process can be performed in the process vessel to remove an undesired species from the liquid phase. The treating process can include at least one of hydro-desulfurization, hydro-denitrogenation, hydro-cracking, hydrogenation, hydro-dearomatization, hydro-deoxygenation, hydro-demetallization, and isomerization. The undesired species can include at least one of sulfur, nitrogen, oxygen, aromatics, olefins, nickel, vanadium, iron, silicon or arsenic. The product-lean liquid phase can include at least one of naphtha, gasoline, kerosene, jet, diesel, gas oils, vegetable oils, animal tallow, and liquid water. The releaser media can include at least one of catalysts, sorbents and reactants.

In certain illustrative embodiments, a method of treating a reactant-lean, product-rich liquid phase in a trickle bed process vessel is also provided. A reactant-lean, product-rich liquid phase and a gas phase can be passed co-currently through an exchange layer in the trickle bed process vessel. The gas phase can include a reactant. At least some of the reaction products from the reactant-lean, product-rich liquid phase can be diffused into the gas phase and at least some of the reactant from the gas phase can be diffused into the reactant-lean, product-rich liquid phase in the exchange layer to form a reactant-rich, product-lean liquid phase. The exchange layer can include a plurality of collector media and a plurality of releaser media. The collector media can include porous solid materials capable of collecting the reactant-lean liquid phase within the collector media. The releaser media can include solid materials having a thin film formed on an outer surface thereof that is capable of facilitating contact and diffusion between the reactant-lean, product-rich liquid phase and the gas phase. The thin film is can be formed on the releaser media during processing as a result of liquid released from the collected liquid phase. In certain aspects, the reactant-rich, product-lean liquid phase can pass through a bed of porous solid elements following the exchange layer. The porous solid elements can include at least one of catalysts, sorbents and reactants. A treating process can be performed in the process vessel to remove an undesired species from the liquid phase, wherein the treating process can include at least one of hydro-desulfurization, hydro-denitrogenation, hydro-cracking, hydrogenation, hydro-dearoatization, hydro-deoxygenation, hydro-demetallization, and isomerization. The undesired species can include at least one of sulfur, nitrogen, oxygen, aromatics, olefins, nickel, vanadium, iron, silicon or arsenic. The reactant-rich, product-lean liquid phase can include at least one of naphtha, gasoline, kerosene, jet, diesel, gas oils, vegetable oils, animal tallow, and liquid water. The reactant diffused from the gas stream into the reactant-lean, product-rich liquid stream can include at least one of methane, butane, propane, butalene, propylene, hydrogen, ammonia, hydrogen sulfide, carbon dioxide, carbon monoxide, sulfur oxides, nitrogen oxides, water gas, oxygen, and nitrogen. The releaser media can include at least one of catalysts, sorbents and reactants. In certain aspects, the size of the releaser media can be no more than one-fourth the size of the collector media. In certain aspects, each of the collector media in the exchange layer can have at least twenty contact points on its outer surface that are contacted by releaser media.

In certain illustrative embodiments, a trickle bed process vessel for treatment of a reactant-lean, product-rich liquid stream is provided. The process vessel can include an exchange layer having a plurality of collector media and a plurality of releaser media, wherein the exchange layer is capable of facilitating diffusion of one or more reactants from a gas phase into a reactant-lean, product-rich liquid phase within the exchange layer to form a reactant-rich, product-lean liquid phase. The process vessel can also include a treatment layer downstream of the exchange layer having a bed of porous solid elements, the porous solid elements having at least one of catalysts, sorbents and reactants and capable of performing a treating process to remove an undesired species from the liquid phase, wherein the treating process can include at least one of hydro-desulfurization, hydro-denitrogenation, hydro-cracking, hydrogenation, hydro-dearomatization, hydro-deoxygenation, hydro-demetallization, and isomerization. In certain aspects, the collector media and the releaser media can be packed within the exchange layer such that each of the collector media has at least twenty contact points on its outer surface that are contacted by releaser media. The gas phase and the reactant-lean, product-rich liquid phase can undergo co-current flow within the exchange layer. The collector media can include porous solid materials capable of collecting the reactant-lean liquid phase within the collector media. The releaser media can include solid materials having a thin film formed on an outer surface thereof that is capable of facilitating contact and diffusion between the reactant-lean, product-rich liquid phase and the gas phase. The thin film can be formed on the releaser media during processing as a result of liquid released from the collected liquid phase. In certain aspects, the releaser media can include at least one of catalysts, sorbents and reactants. In certain aspects, the size of the releaser media can be no more than one-fourth the size of the collector media. The undesired species can be at least one of sulfur, nitrogen, oxygen, aromatics, olefins, nickel, vanadium, iron, silicon or arsenic, and the reactant-rich, product-lean liquid phase can be at least one of naphtha, gasoline, kerosene, jet, diesel, gas oils, vegetable oils, animal tallow, and liquid water, and the reactant diffused from the gas stream into the reactant-lean, product-rich liquid stream can be at least one of methane, butane, propane, butalene, propylene, hydrogen, ammonia, hydrogen sulfide, carbon dioxide, carbon monoxide, sulfur oxides, nitrogen oxides, water gas, oxygen, and nitrogen.

BRIEF DESCRIPTION OF THE DRAWINGS

Some of the features and benefits of the present invention having been stated, others will become apparent as the description proceeds when taken in conjunction with the accompanying drawings, in which:

FIG. 3A and FIG. 3B are comparison views of liquid and gas co-current flow through an exchange layer and an exchange layer spanning a bed in a process vessel in accordance with illustrative embodiments of the presently disclosed subject matter.

FIG. 4 is a side view of an exchange layer in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

In accordance with the presently disclosed subject matter, various illustrative embodiments of a method for enabling the gas exchange and chemical reactions with one or more liquid streams contained in a reactive process vessel are provided herein.

In certain illustrative embodiments, as shown in FIGS. 1-14, multi-phase reactions can occur within a process vessel 100. One or more reactant-containing feed gas components can be diffused into one or more feed liquids containing undesired species. These diffused phases can be passed over one or more element beds 120 disposed in the vessel 100. The one or more diffused fluid phases can be contacted with active sites 40 within the one or more element beds 120 in the vessel 100. Active sites 40 typically include one or more of catalyst sites, sorbent sites and reactant sites.

Element beds 120 can contain one or more elements 125. Elements 125 are typically porous solid materials. Elements 125 can be non-porous solid materials. Elements 125 can be one or more of catalysts, sorbents, and reactants. Elements 125 are typically 1/32" to 1.5" in size and can be packed in beds. Elements 125 can contain or hold active features hereinafter called active sites 40. Active sites 40 are one or more of catalyst sites, sorbent sites, and reactant sites. The external surface area of elements 125 is typically in the range of 100 to 800 square feet per cubic foot of element beds 120.

Figure 1:
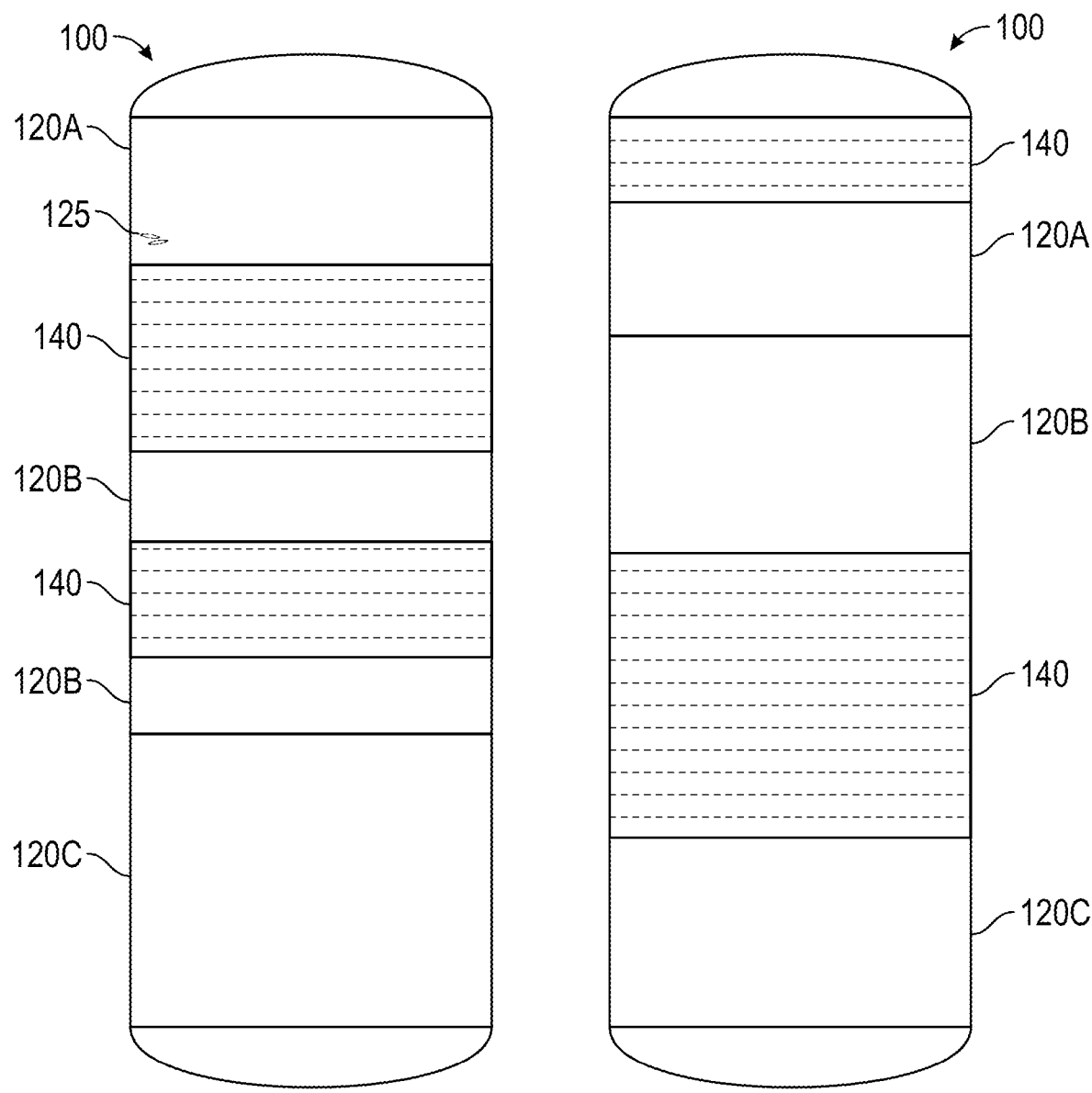
FIG. 1 is a side view of process vessels having a plurality of layers or zones in accordance with illustrative embodiments of the presently disclosed subject matter.

As shown in FIG. 1, elements 125 in element beds 120 can all be the same, or elements beds 120A, 120B, 120C etc, can have different types or sizes of elements 125, or various combinations thereof throughout vessel 100, according to various illustrative embodiments.

Porous elements 125 can be comprised of micropores, mesopores and/or macropores. Micropores have diameters less than 2 nanometers. Mesopores have diameters between 2 nanometers and 50 nanometers. Macropores have diameters larger than 50 nanometers. Elements 125 can contain other porous features with diameters up to 300 nanometers. Under appropriate operating conditions, the element beds 120 allow reactions to remove undesired species from the diffused fluid, create species-free liquid product, and create other products from the reaction between the gas-diluted phase and the undesired liquid species.

In certain illustrative embodiments, components of the presently disclosed subject matter can include one or more of: element beds 120 containing active sites 40 disposed in the vessel 100; reactant-containing gas phases fed to the vessel 100; undesired species-containing liquid phases fed to the vessel 100; solutions of gas and liquid feed contacted with element beds 120; species-free liquid products formed on the active sites 40; other products formed on the active sites 40 from reaction of gas components with undesired liquid species; remaining feed gas phases recovered for recycle or subsequent processing; other products recovered for subsequent processing; and liquid products free of undesired species.

Efficient operation of vessel 100 relies on effective mixing. For liquid and gas phase flows, mixing refers to any operation used to combine the phases. Agitation is a common method of mixing, which forces fluids to combine by mechanical means. Mixing fluids increases diffusion or exchange of components between them. Diffusion of fluid components is a well-known phenomenon. Diffusion from a region of high concentration to one of low concentration is defined by Ficks' laws, (see Adolph Ficks, 1855). Ficks' laws state that high-concentration components present in a fluid can diffuse into fluid containing little-to-no amounts of the same components. Ficks' laws also state that the rate of change in concentration of a component across a fluid-fluid boundary is proportional to the surface area of that boundary. A reduction in interfacial surface area between two phases can reduce the speed with which one phase can diffuse into another.

In accordance with the presently disclosed subject matter, it is desirable to have high interfacial surface area between the liquid and gas phases at the interface of elements 125 in vessels 100 to create sufficient exchange between the phases. The gas exchange is important to create conditions which are suitable for desirable reactions.

A gas phase which partially dissolves into a liquid phase creates a gas-liquid solution. The maximum amount of dissolved gas in the liquid phase depends on the saturation limits. Higher pressures and lower temperatures promote increased saturation limits. Saturation is determined by the diffusion rate of the gas into the liquid. The diffusion rate can have an influence on the reaction kinetics which requires the simultaneous presence of active sites 40, liquid reactants, and gas reactants to form products. Reaction kinetics define the rate at which a particular reaction occurs. Higher concentration of dissolved gas in the liquid phase is desired in order to promote desired reactions.

In accordance with the presently disclosed subject matter, high rates of diffusion can occur in vessels 100 when one or more high-concentration gas phase components mix with one or more liquid phase materials that contain little or none of the same components. A liquid phase with a low concentration of dissolved, reactive gas relative to the solubility limits can be called a "reactant-lean" liquid phase. A liquid phase with a high concentration of dissolved, reactive gas relative to the saturation limits can be called a "reactant-rich" liquid phase. Reactant-lean liquid phases can occur in the original liquid streams fed to the vessel 100 or can be due to depletion of the one or more dissolved gases in the one or more liquid phases during interaction with active sites 40. Within a given process vessel 100, a reactant-rich liquid phase has more gas-based reactant dissolved in the liquid phase when compared to a reactant-lean liquid phase. Reactant-lean liquid phases are less capable of producing a desired reaction compared to reactant-rich liquid phases. One or more products can be created as a result of reaction with active sites 40. Desirable reactions can reduce undesired species by converting reactants within reactant-rich liquid phases to products. Some of these products are gases dissolved in the liquid phase. These dissolved gas products are herein called "reaction products." Reaction products are released from active sites 40 into the liquid phase. Reaction products can exist as a solute in the liquid phase and can interfere with reactions between gas phase reactant and undesired species, resulting in a reduced rate of desirable reactions. A liquid phase with higher concentrations of one or more reaction products can be called a "product-rich" liquid phase. Where a product-rich liquid phase forms, a concentration gradient of reaction products can be developed between the liquid and gas phases and diffusion of reaction products into the surrounding gas phase can be promoted. Where a product-rich liquid phase forms, desirable reaction rates can be reduced. It is desirable to remove these reaction products from the liquid phase via gas exchange of reaction products. Liquid phases with relatively low concentrations of reaction products can be called a "product-lean" liquid phase. Product-lean liquid phases can be more capable of producing a desirable reaction compared to product-rich liquid phases because less reaction products interfere with the reactions between undesired species and dissolved gas reactants. Liquid phases can be described as reactant-rich or reactant-lean and product-rich or product-lean liquid phases.

In accordance with the presently disclosed subject matter, one or more liquid phases fed to a vessel 100 contain undesired species to be mitigated or converted within the process. One or more gas components can be mixed with feed liquid phases by diffusion and gas exchange. Exchanged gas feed can contain one or more reactant components capable of mitigating the undesired species in the liquid phase. Mitigation can be performed at and by the active sites 40 contained in element beds 120. These active sites 40 help to promote reactions to remove undesired species from the liquid phase. As a result of the promoted reactions, reaction products can be generated which become a part of the liquid and gas flow of the vessel 100. In a conversion process where reactants, including active sites 40 and fluid components, are freely available to interact with each other, conversion can take place at the speed of the molecular interaction between the reactants, typically defined as the rate of reaction.

In traditional multiphase reactors, a number of steps must proceed in order for the desired reaction to occur: one or more gas and liquid phases must be supplied as feeds to the vessel; one or more gas phase component reactants must diffuse into the one or more liquid phase reactants; active sites 40 must be available to undertake reaction; one or more diffused gas reactants and one or more liquid phase reactants must react together at the active sites 40.

The reactor's overall rate of reaction will be limited to the slowest rate in the steps described above. For many but not all typical process vessels, the rate of diffusion of one or more gas phase reactants into one or more liquid phase reactants is typically the rate-limiting step. As described previously, Ficks' laws dictate this rate of diffusion is dependent on the interfacial surface area between the liquid phase and the gas phase. A reduced rate of diffusion can be an impediment to process vessel operation.

In accordance with the presently disclosed subject matter, it is desirable to have an inter-fluid phase surface area for element beds 120 within vessel 100 as large as possible to promote diffusion rates. This can create reaction-rich, product-lean liquids and will lead to higher reaction rates.

While introduced together, the one or more liquid and gas phases can have varying velocities, temperatures, pressures, and components in the vessel and within the bed of elements 120. The flows of liquid phases through the element beds 120 are largely driven by gravity while the gas phase flows are largely driven by the pressure differential between the inlet and outlet of the vessel. The gas phase can also experience a drag force due to boundary conditions at the liquid-gas interface. The retarding force on the gas phase can increase the amount of pressure differential required to push the gas phase through the vessel and its element beds 120. The liquid phase can feel an equal and opposite force from the gas phase. The transportive forces on the liquid phases are the sum of gravity and the drag force. As the fluid phases move deeper into the bed or vessel, the liquid and gas phases can attempt to arrange themselves in a way which minimizes the pressure differential across the bed or vessel. This arrangement tends to increase the separation of liquid and gas phase volumes, which can reduce the interfacial surface area between the two phases. Reduction of surface area and increase of liquid-gas phase volume separation can continue and can grow as the fluids move deeper into the bed or vessel.

In accordance with Ficks' laws, larger surface areas between liquid and gas phases characterize well-mixed liquid and gas phases as well as greater diffusion or exchange of molecules between the phases. Smaller surface areas between liquid and gas phases can characterize poorly mixed liquid and gas phases as well as lesser diffusion or exchange of molecules between the two phases. The reduction of liquid-gas surface interface can result in reduced amounts of gas reactant moving into the liquid phase, limiting the effectiveness of the element bed 120 or vessel 100. Reduced diffusion between fluid phases can retard exchange between the liquid and gas. This leads to reactant-rich, product-lean liquids transitioning to reactant-lean, product-rich liquids as the phases flow through the vessel. This is not a desirable transition.

There are many different vessel types. These can be regarded as reactors, separators, guard vessels, or sorbent beds. In certain illustrative embodiments a reactor is a type of trickle bed process vessel. A large variety of treating processes exist in different types of vessels. Many of these are hydro-treaters. Examples of processes are hydro-desulfurization, hydro-denitrogenation, hydro-cracking, hydrogenation, hydro-dearomatization, hydro-deoxygenation, hydro-demetallization, isomerization, and other industrial processes. Unit types in refining and petrochemical applications can be naphtha hydro-treaters, PyGas hydro-treaters, reformers, diesel hydro-treaters, gas oil hydro-treaters, cat feed hydro-treaters, FCC Gasoline hydro-treaters, FCC hydrogenation units, renewable diesel hydro-treaters, fixed-bed transesterification vessels, hydro-cracker pre-treaters, hydro-crackers, isomerization units, kerosene hydro-treaters, jet hydro-treaters, lube oil hydro-treaters, de-waxing units, resid hydro-treaters, dryers, chloride treaters, clay treaters, salt dryers, and other fixed bed units.

Liquid streams can be organic or inorganic. Common liquid phases include vegetable oils, animal tallow, water, hydrocarbons, crude oil and derivatives of crude oil such as naphtha, gasoline, kerosene, jet, diesel, gas oil, or other crude oil derivatives. Common gas phases include methane, butane, propane, hydrogen, ammonia, hydrogen sulfide, hydrogen chloride, carbon dioxide, carbon monoxide, sulfur oxides, nitrogen oxides, water, oxygen, nitrogen, or other gases. Gases can also be mixtures. Common reaction products include treated hydrocarbon, hydrogen, ammonia, hydrogen sulfide, carbon dioxide, carbon monoxide, water, and other gases.

A widely-used example of a multi-phase vessel is a hydro-treating vessel feeding both a liquid hydrocarbon, or oil, phase containing various undesired sulfur species and a gas phase containing hydrogen. These phases are passed over active sites 40 contained in element beds 120. A desirable reaction of hydro-treaters can be to react the hydrogen gas phase with the undesirable sulfur species in the oil phase at the active site 40. The desirable reaction produces a sulfur-free hydrocarbon and hydrogen sulfide. The hydrogen sulfide is a reaction product, dissolved in the liquid phase. In this example, as the desirable reaction is repeated, hydrogen can be depleted from the liquid phase and hydrogen sulfide can build up in the liquid phase. Gas exchange is desired to increase the concentration of dissolved hydrogen gas in the liquid oil phase and simultaneously reduce the dissolved hydrogen sulfide gas from the liquid oil phase, as shown in FIG. 6B. The gas exchange depends on the interfacial surface area between the liquid oil phase and the gas phase. The more thoroughly mixed the phases, the higher the surface area between them resulting in a higher rate of gas exchange. A high degree of mixing is desirable. Example hydro-treaters typically operate as trickle bed reactors having temperatures ranging between 200 and 800 degrees Fahrenheit and pressures ranging between 200 and 2,000 psi. Trickle bed reactors are multi-phase reactors that contain fixed beds of solid elements and fluid phases that flow co-currently through the reactor.

Henry's Law (see William Henry, 1803) states that the mass of a dissolved gas in a given volume of solvent at equilibrium is proportional to the partial pressure of the gas. In the conventional hydro-treating example, to counteract the loss of liquid-gas surface interface and to encourage the diffusion of hydrogen into the oil, hydrogen must be present in flow rates 3 to 5 times larger than the flow rate of oil entering the vessel 100. If 200 standard cubic feet of hydrogen per barrel of oil are required for conversion, 600 to 1000 standard cubic feet of hydrogen per barrel of oil needs to be fed to and circulated within the vessel 100. The fluid feed phases are mixed at points of introduction into the vessel 100 or beds 120 by hardware known as mixers, quenches, and/or distributor trays to allow gaseous hydrogen diffusion into the oil. Depending on vessel 100 pressure, temperature, and hydrogen purity, the maximum solubility of hydrogen in the oil is between 50 and 100 standard cubic feet per barrel of oil. The hydrogen and sulfur species in the diffused oil phase can interact with the active sites 40 to perform the desired desulfurization reactions. These reactions create hydrogen sulfide as a recoverable by-product. Below the hardware known as mixers, quenches, and/or distributor trays, and above the element beds 120, top bed material 170 can be used for capabilities comprising filtration, distribution, and/or hold down.

A trickle bed reactor is a multi-phase vessel 100 configuration. The co-current flows of liquid and gas through the reactor allow interaction of gas components with the liquid phase. Element beds 120 installed in the vessel 100 can provide new and surprising advantageous reactor performance including improvements in gas phase diffusion, reaction effectiveness, hydrogen utilization and reaction product production and recovery. When element beds 120 are packed into a trickle bed vessel, they have a packing efficiency and coordination number. Packing efficiency is defined as the volume percent of a space occupied by an element bed 120. The coordination number is the number of contact points any element 125 has with the elements 125 that surround it. In general, as the packing efficiency increases so does the coordination number. The Kepler Conjecture (see Johannes Kepler, 1611) states that no arrangement of equally sized spheres filling space has a greater average density than that of the "cubic close packing." The cubic close packing is a highly ordered state and unlikely to be achieved unless spheres are placed by hand. The coordination number for cubic close packing of spheres is 12. The loading process in these vessels 100 is largely random, but can be controlled to vary the degree of packing efficiency and contact points between elements 125. Highly ordered close packing is not probable in these loadings and coordination numbers can be less than the maximum. It is desired to increase the packing efficiency to have as many elements 125 as possible in the vessel 100. However, hydrodynamic constraints, e.g., differential pressure between phases, can limit the allowed packing efficiency. The depths of the loading can be anywhere from approximately a few inches to 100 feet. These are conventionally loaded as one element bed 120, with elements 125 of varying shapes and sizes, but are typically similarly loaded. Deeper element beds 120 are generally used to add cycle time and to improve the conversion which can be achieved during operation. Diffusion of gas phase materials into the flowing liquid phase material can depend on the rate of diffusion as determined by elemental composition plus vessel 100 temperature, pressure and boundary layer issues governing the contact of gas and liquid species.

Liquid and gas phase flows will have superficial velocities defined by the volumetric flow rate of these phases divided by the cross-sectional area of the process vessel 100. Actual liquid and gas phase flow velocities can have local velocity variations which range from near zero to over four times the calculated superficial liquid flow velocity. Additionally, density differences between liquid and gas phases exist. In part, this is what can lead to liquid and gas phase separation and reduced interfacial surface area between the phases.

"Liquid hold up" is a portion of the volume within the interstitial spaces between the elements 125. Liquid hold up can occur wherever the interstitial liquid flow velocity is zero or near zero. Liquid flow volume can be considered stagnant in these parts of the element bed 120. Typical liquid hold up in element beds 120 is in the range of 20%-40% of the interstitial space between the elements 125 and occurs in locations where the elements 125 are touching one another.

When element beds 120 are packed or loaded, they can be randomly packed and not in a highly ordered state. In this randomly packed state approximately 12 or less elements

125 contact any single element 125. The number of contact points can limit the pathways liquid can take between elements 125.

Important properties related to the behavior of liquid and gas phase flow in a trickle bed reactor are determined by the properties of the element beds 120 themselves. These properties are packing efficiency, void space diameter, and liquid hold up volume. Packing efficiency is defined as the percent of the element beds 120 which fill a given space. Typical packing efficiencies for element beds 120 are in the range of 55% to 65%. Typical space not filled by element beds 120 is, therefore, 35% to 45%. This space is herein called "void space." Higher packing efficiency allows for higher mass loadings of elements 125 into the vessel:

void space %=100%-packing efficiency %

The void space in the element bed 120 also affects the range of liquid hold up the element beds 120 can achieve. With the packing efficiencies described, liquid hold up can be in the range of 7%-18% of the element bed 120 volume.

Void space diameter can be taken as the average size of the void spaces which are developed by packing the element beds 120. One way to characterize the expected void space diameter of a packed element bed 120 is to use hydraulic diameter. Hydraulic diameter is defined by:

$$D_h = \frac{4 * \frac{1-p}{p} D_e}{6p}$$

Where $D_h$ is hydraulic diameter, $D_e$ is the nominal diameter of the elements 125, and p is the packing efficiency. For an element bed 120 of nominally ⅛ inch (3.17 mm) sized elements 125 with a packing efficiency of 60%, the hydraulic diameter is 2.34 mm or about ~73% of the element 125 diameter. For an element bed 120 of nominally sized 1/20 inch (1.27 mm) sized elements 125 with a packing efficiency of 60%, the hydraulic diameter is 0.94 mm, which is again ~73% of the element 125 diameter. The hydraulic diameter can be taken as an approximate estimation of the average diameter of the void space between elements 125, called the void space diameter.

Liquid hold up volume can be related to void space diameter and packing efficiency. Void space diameter controls the efficacy of liquid hold up with smaller void space diameters allowing a higher liquid hold up. Packing efficiency can also influence the amount of liquid hold up. The higher the packing efficiency, the lower the total liquid hold up. As the void space diameter shrinks, the liquid hold up in the void space can become driven by capillary action (see Leonardo da Vinci, c. 1500, see Robert Boyle, 1660). Capillary action occurs when the adhesion to the surfaces of a material is stronger than the cohesive forces between the liquid molecules or even the transportive forces on the liquid molecules. The surface tension between the liquid and solid acts to hold the surface intact. In the case of porous beds and porous bodies, adhesion of liquid to the surfaces of materials can cause a force on the liquid which acts to keep the liquid in contact with the solid. Due to these, capillary action can increase the liquid hold up of material. Materials with high capillary action typically have high surface area to volume ratios.

While higher liquid hold up improves the surface area and contact between the fluid phases and solid Elements, this is typically an undesirable property in trickle bed processing where intimate contact between liquid and gas phases components is important. Small void space diameters can drive up liquid hold up while eliminating void space available for gas flow. It is more advantageous to have trickle bed properties which allow for thin films 35 across the elements 125 in order to maximize the interaction between the liquid and the gas. A typical "thin film" 35 is comprised of a region of liquid phase partially bound by a solid phase with a free surface where the liquid phase is exposed to a gas phase and the liquid phase travels on the surface of the solid phase. Small void space diameters can encourage liquid hold up and, in the case of elements 125, contribute to the collapse of thin films 35. It is desirable for a trickle bed reactor to sustain thin films 35. The gas is then able to flow over and interact with the thin film 35 of liquid. Thin films 35 advantageously lead to higher liquid surface areas with higher liquid-gas interface enabling gas exchange and, therefore, availability for reaction with elements 125. But as discussed above, conventional trickle bed reactor thin films 35 are typically not hydro-dynamically stable and can eventually collapse. Due to this instability, high liquid-gas interface surface area is difficult to achieve and maintain.

One advantageous method to overcome the necessity of high liquid-gas interaction is to provide the ability to premix and then distribute the liquid and gas onto the element bed 120. Conventional vessels can provide initial mixing of the fluid phases by using "fabricated engineered mixer equipment" or "distributor trays" installed to facilitate mixing and distribution of fluid phases. This can also be accomplished by way of one or more fabricated engineered distribution trays or vapor phase mixers installed downstream of vapor injection. Such engineered mixer equipment is typically used to promote diffusion of hydrogen into oil, creating a reactant-rich liquid. Engineered mixer equipment can be complex, difficult and expensive to design, fabricate, install, operate and maintain. Installation, operation and maintenance requires that the equipment is secured and aligned to be perpendicular to the flow of streams within the vessel 100. Additionally, the installation of such devices can take up 3 to 10 feet of vessel 100 depth, space where there are typically no elements 125 installed. A properly installed and operated distributor tray can provide a high degree of initial bed wetting and good liquid-gas-solid interaction at the top of the element bed 120. Improperly installed and operated distributor tray can ensure poor bed-wetting and top bed 170 interaction. Such devices including trays and quench nozzles can be installed in the middle of the vessel 100.

This high liquid-gas surface area provided at the top of the element bed 120 becomes reduced as the fluid phases go deeper into the element bed 120. Regions of limited to no interaction between liquid and gas phases take shape. This low interaction creates undesirable regions of reduced liquid-gas surface interface, decreasing the diffusion rate between the two fluid phases. The decreased diffusion rates can lead to reactant starvation. Reactant starvation develops where one or more gas reactant components are consumed in the diffused fluid state faster than they can be replenished from the surrounding gas phase. The reduced diffusion leads to the development of a reactant-lean liquid. The growing presence of liquid-gas separation and reactant starvation can: increase the hydrogen flow rate required to sustain gas exchange; decrease the effectiveness of the element beds 120; reduce overall vessel 100 performance due to a reduction in desired reactions; and increase the presence of coking reactions.

In trickle bed vessels 100, one or more desired gas components can be depleted from the liquid phase due to reaction between: undesired liquid species reactants, diffused gas phase reactants, and active sites 40.

Reaction products accumulate in the diffused liquid phase as a result of the same reactions leading to a product-rich liquid. For efficient reaction, one or more desired gas phase reactant components must be replenished into the one or more diffused liquid phases and the one or more reaction products removed from the diffused liquid phases. It is desirable for the reactant-lean, product-rich liquid to transition to a reactant-rich, product-lean liquid. The separation of liquid and gas phases caused by deterioration of the trickle bed reactor performance reduces the surface area between the phases and disables these functions. This can result in reduced reaction kinetics because the desired gas phase reactants are not available for reaction and the reaction products remain dissolved in the fluid and interfere with the desired reactions between reactants.

In the hydro-treating example, if the hydrogen reactant becomes limited, other reactions can take place in the absence of hydrogen. In general, these other reactions are referred to as coking and can cause harm to the effectiveness of the element bed 120. Coking takes several forms, each form resulting in a buildup of difficult species that can block active sites 40 on the element beds 120.

Coking occurs due to molecular cracking, olefinic polymerization, and aromatic polymerization. Aromatic polymerization refers to the growth of polycyclic aromatic compounds. Once these molecules grow large enough they are able to deposit on the surface of active sites 40. These are undesired products. Olefinic polymerization refers to the growth of unsaturated paraffin compounds. These grow to be large and block active sites 40. Molecular cracking refers to the continual breaking of hydrocarbon chains. As these chains are broken, if hydrogen is not present in sufficient amounts, unsaturated molecules are formed and active sites 40 are blocked. Coking is a major contributor to element bed 120 deactivation and can lead to the "death" of the active sites 40, requiring the vessel 100 to be shut down and the elements 125 to be removed and/or exchanged. It is desirable to reduce the deactivation rate caused by coking.

The performance of reactions in the one or more conventional element beds 120 can change with the depth of the beds. At the top of the upper-most element bed 120, near the properly installed, operated and maintained engineered mixer equipment 190, trickle bed reactor performance is high and coking reaction rates may be minimal. As the fluid phase goes deeper into the bed, element bed 120 performance deteriorates: the surface area between the liquid phase and gas phase decreases, the dissolved gas in the liquid is consumed, reactant starvation ensues, the coking reaction rates can increase, and the active site 40 performance drops. The higher the concentration of undesirable species in the liquid phase, the faster reaction starvation can develop. In the case of a hydro-treater intended to remove sulfur species, the overall lower rates of desired reactions result in higher product sulfur content, higher operating temperature, and shorter cycle lengths.

Processing conditions can be adjusted to respond to element bed 120 deactivation to keep the processing vessel 100 producing desirable reactions. Responses to element bed 120 deactivation can require increased element bed 120 temperature and/or reduction in element bed 120 feed rate. Increase in temperature serves to increase reaction rate in the vessel 100 to make up for lost activity. Reduction in feed rate reduces the required reaction rate. Continued adjustments or responses will fail as temperature increase eventually will exceed vessel 100 operating constraints and feed rate reduction results in economically unfavorable operation. Steps taken at this point include vessel 100 shutdown and steps to make element bed 120 replacement.

Disclosed are novel effects which increase the rate of gas exchange, done by exchange layers 140, into and out of two or more fluid phase components in one or more vessels 100 containing one or more element beds 120 which facilitate conversion between the reactants contained in the fluid phases. Steps which create these include one or more: vessels 100 equipped with improved exchanged gas facilities; diffused fluid phases with improved interactions; exchange layers 140 which improve reactant replenishment via thin film 35 diffusion; reduced uncontaminated active sites, including coke, contained in element beds 120; and reaction products escaping the reaction zone quickly and efficiently.

Increased reactant-rich liquid phases remove gas exchange limitations and can increase the element bed 120 reaction rate. Both of these improvements can lead to benefits such as lower operating temperature, increased throughput, and reduced gas circulation. Improved availability of the gas phase components in the liquid phase can also serve to reduce the rate of a harmful side reaction, like coke formation, on or in the element beds 120. This helps mitigate one of the most common causes for vessel 100 shutdown and increases the capability of an element bed 120 to perform its desired reactions.

Additional disclosed benefits from improving gas exchange would be the ability to achieve higher conversion rates for a constant set of operating conditions (e.g. temperature, pressure, and feed rate). For similar inlet concentrations of undesired liquid species at constant operating conditions, improved gas exchange would provide lower concentrations of undesired species in the product phases of such a vessel 100.

The use of exchange layers 140 can have surprising and unexpected results. Such results can have positive impacts on the operation of a processing vessel. Exchange layers 140 which enable a low rate of coke formation can result in a more constant or nearly constant inlet temperature over time. Since the inlet temperature is not being raised, the process vessel 100 is able to operate for a longer period of time or process more feed before a shutdown is required. Furthermore, operating at lower temperatures also enables improved rates of aromatic saturation and exchange layers 140 could be useful in helping to improve aromatic saturation on the basis of both hydrogen availability and a reduction in operating temperature. Even further, exchange layers 140 can enable conversion of compounds which can require multiple steps to remove the undesired species. As an example, some sulfur species are known as "hindered", where aromatic rings block the removal of the hindered sulfur from the hydrocarbon. The aromatic ring must first undergo a saturation reaction to become a naphthene, followed by the sulfur removal step. The aromatic saturation step unblocks the sulfur molecule and both reactions must proceed in order, otherwise the naphthene can convert back to an aromatic, once again hindering the sulfur removal.

Another surprising and unexpected result of using an exchange layer 140 would be a reduced amount of carbon build up on elements 125 at or below the level of the exchange layer 140. In element beds 120 where hydrogen consumption is high, once the liquid phase becomes a "reactant-lean" liquid phase, coking formations take place and deposit carbon on the elements 125. The buildup of carbon harms the process vessel operation and can make it difficult to unload the elements 125 from the process vessel 100. The carbon build up fuses the elements together 125 making unloading difficult. Use of exchange layers 140 at these locations can reduce carbon deposition. In place of coking, desired reactions can occur. This result could be observed during the unloading of such a process vessel 100. The elements above the exchange would be filled with carbon and be fused together, where the exchange layer 140 and the element bed 120 below it would have reduced amounts of carbon and the elements 125 would be free flowing.

Figure 2:
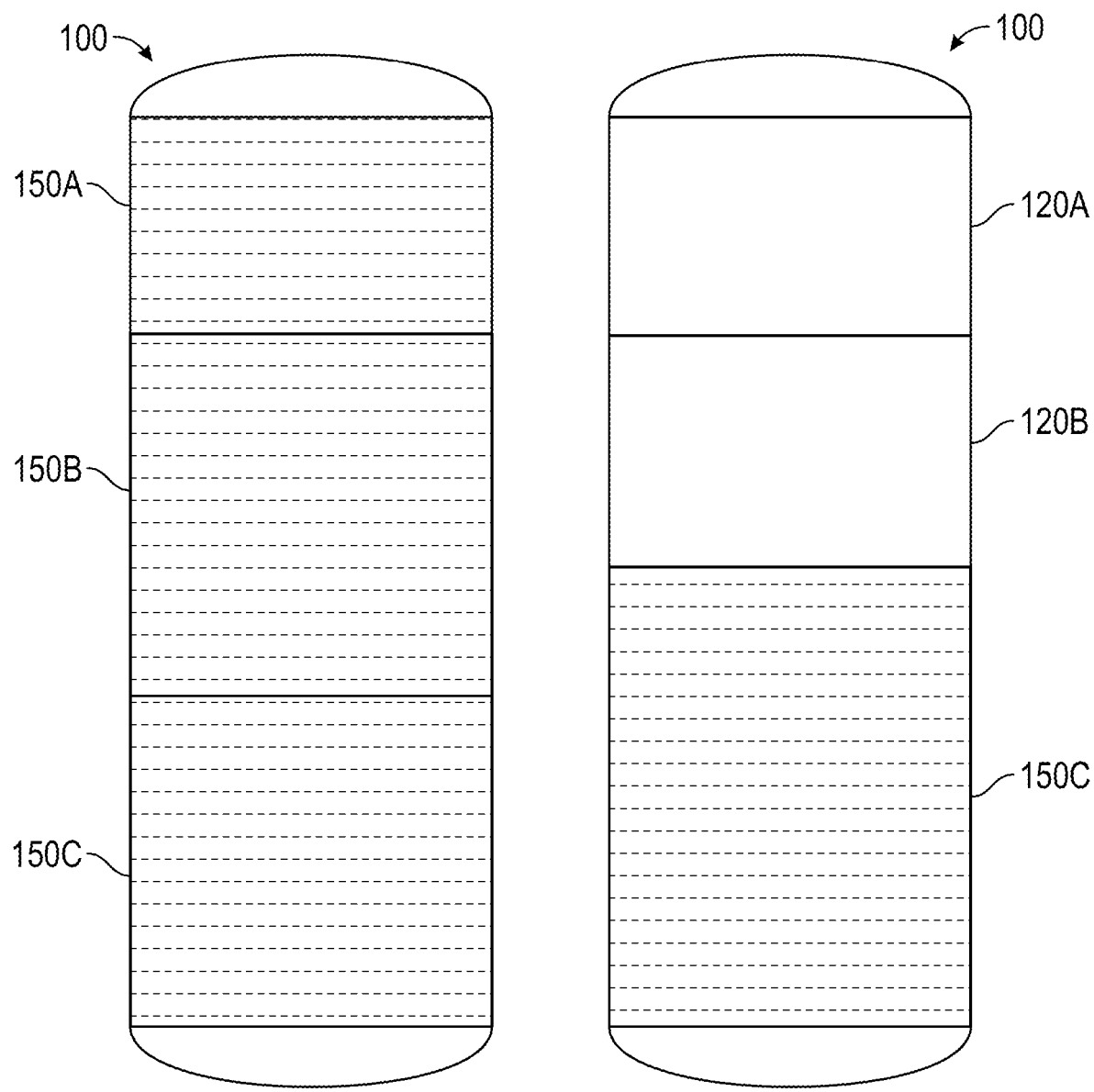
FIG. 2 is a side view of process vessels having a plurality of layers or zones in accordance with illustrative embodiments of the presently disclosed subject matter.

In certain illustrative embodiments, as shown in FIG. 1 and FIG. 2, vessel 100 can include one or more exchange layers 140 containing media which can facilitate gas exchange between fluid phases in the vessel 100. Vessels 100 can be one vessel or multiple vessels functioning together. Exchange layers 140 can avoid starvation of fluid reactants. Exchange layers 140 can advantageously facilitate the production of reactant-rich, product-lean liquid phases. In certain illustrative embodiments, the performance of exchange layers 140 can be dependent on the location and depth of the media, the size and structure of the media, the surface area of the media, the positions of the media and/or the positions and compositions of the fluid phases in the vessel 100. Exchange layers 140 can be positioned relative to element beds 120. Exchange layers 140 can be positioned upstream of element beds 120 to facilitate the diffusion of fluid phases entering the element beds 120. Exchange layers 140 can also be positioned downstream of element beds 120 to facilitate diffusion of fluid phases for processing in downstream element beds 120. Exchange layers 140 can be installed along with distributor trays and/or injection ports that may also be in the vessel. Exchange layers 140 can be installed below top bed 170 material prior to entry into the element bed 120 or can also be installed at the top of a bed within vessel 100. Exchange layers 140 can, but do not need to, span the diameter of the vessel 100. Exchange layers 140 could be pocketed throughout the vessel 100, whereby they do not span the diameter of the vessel 100, but still provide functionality in the region where they do exist.

In certain illustrative embodiments, the disclosed media in exchange layers 140 can include one or more zones containing collector media 20 and one or more zones containing releaser media 30. The interaction of these media with the liquid and gas phases helps to advantageously facilitate the exchange of liquid and gas phase components in the vessel 100. As illustrated in FIG. 3A, the collector media 20 and the releaser media 30 can enable gas exchange for co-current flow of the phases within exchange layer 140. As illustrated in FIG. 3B, the collector media 20 and the releaser media 30 can enable gas exchange and act as a treating bed for co-current flow within exchange layer 140. In certain illustrative embodiments, collector media 20 utilize liquid hold up and capillary action to facilitate one or more processes occurring within vessel 100. This can occur within exchange layer 140, whereby the liquid hold up is increased for a given region of volume within one or more collection zones 22 of collector media 20. The collection zones 22 provide a localized region in collector media 40 where the flowing liquid phase can be collected or held, hereinafter "liquid collection". Once liquid collection is maximized within the collection zone 22, any addition of liquid volume can cause an outflow of liquid from that region. Collector media 20 can be shaped so as to maximize or minimize the size of the liquid collection region in collection zone 22 and allow the outflow of liquid from the liquid collection 22. The filled liquid collection 22 also allows gas phase flows to bypass the collector media 20 and interact with the downstream releaser media 30.

The presently disclosed subject matter provides surprising and unexpected results as compared to previously used technologies. The described liquid hold up can be detrimental to process vessel operation due to the inherent forces which promote separation of liquid and gas phases.

Figure 5A:
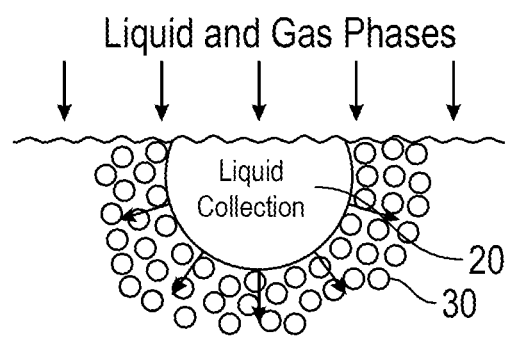
FIG. 5A is a side view of collector media and releaser media in accordance with an illustrative embodiment of the presently disclosed subject matter.
Figure 5B:
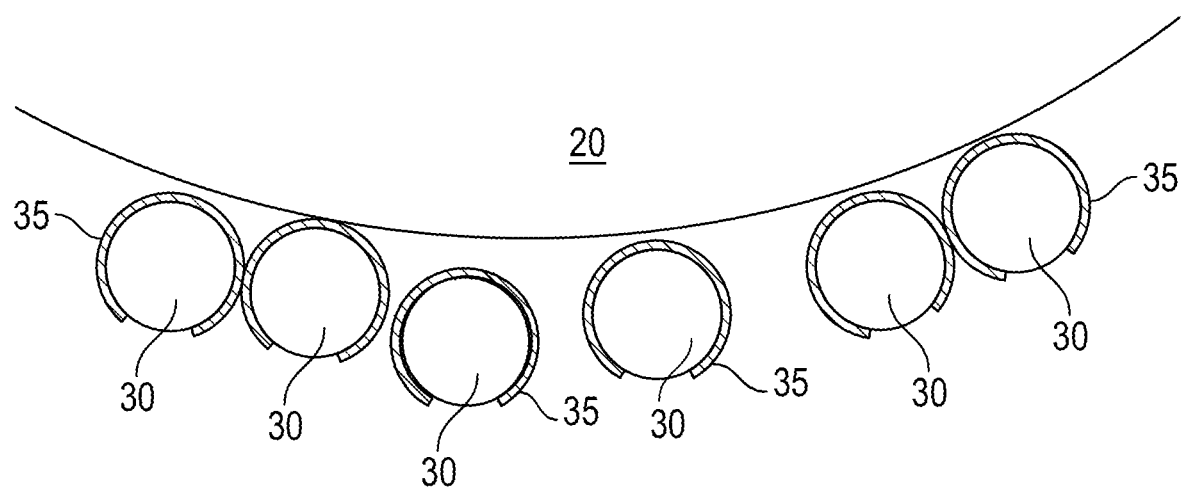
FIG. 5B is a side view of collector media and releaser media with thin film formed thereon in accordance with an illustrative embodiment of the presently disclosed subject matter.

In certain illustrative embodiments, exchange layers 140 avoid this problem by creating a region of high surface area by providing collector media 20 and high surface area releaser media 30 adjacent to and surrounding the collector media 20, as shown in the illustrative embodiments of FIG. 4 and FIG. 5A. This region enables the outflow of liquid from collector media 20. Capillary action can draw and hold liquids into collector media 20. Collector media 20 facilitated by liquid hold up and capillary forces deliver uniform liquid flow across the region of high surface area.

Figure 6:
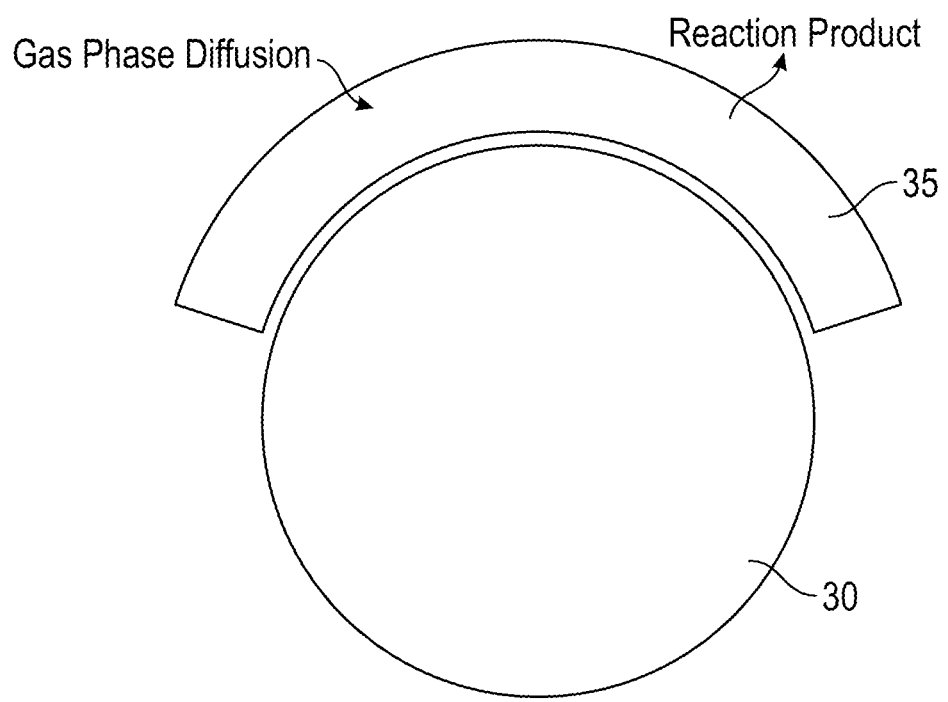
FIG. 6 is a side view of releaser media with thin film formed thereon in accordance with an illustrative embodiment of the presently disclosed subject matter.
Figure 6A:
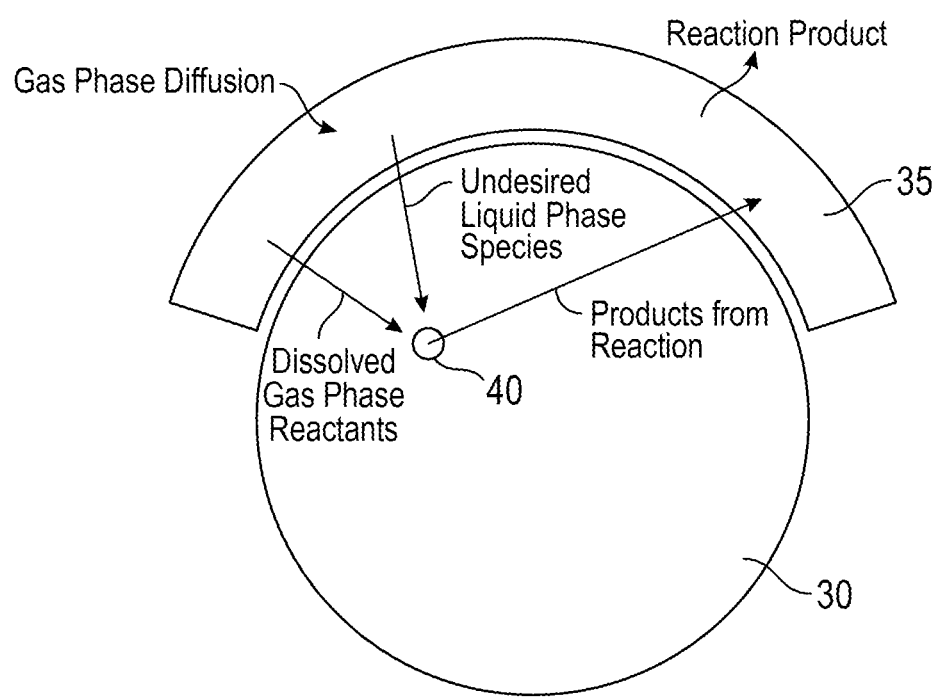
FIG. 6A is a side view of releaser media with thin film formed thereon and an active site in accordance with an illustrative embodiment of the presently disclosed subject matter.
Figure 6B:
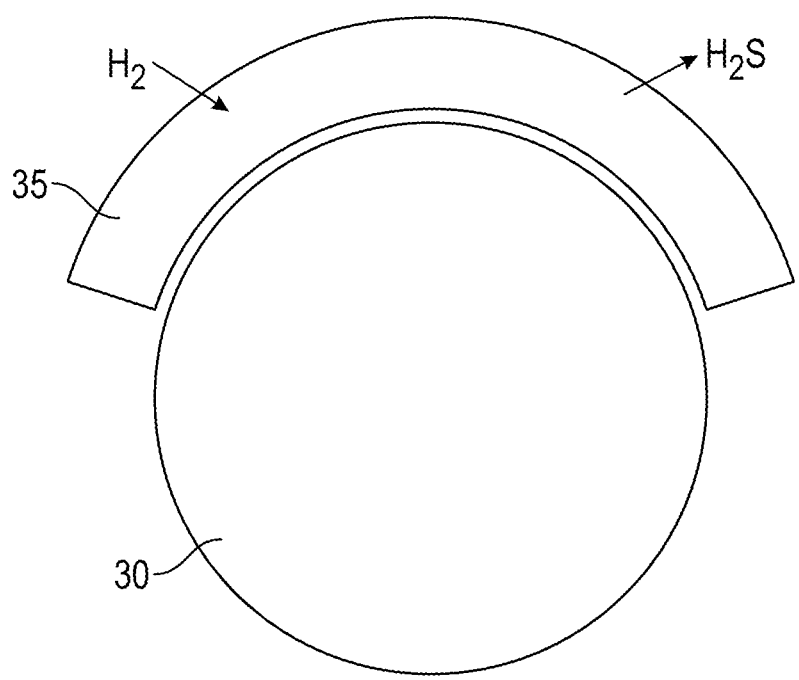
FIG. 6B is a side view of releaser media with thin film formed thereon in accordance with an illustrative embodiment of the presently disclosed subject matter.
Figure 6C:
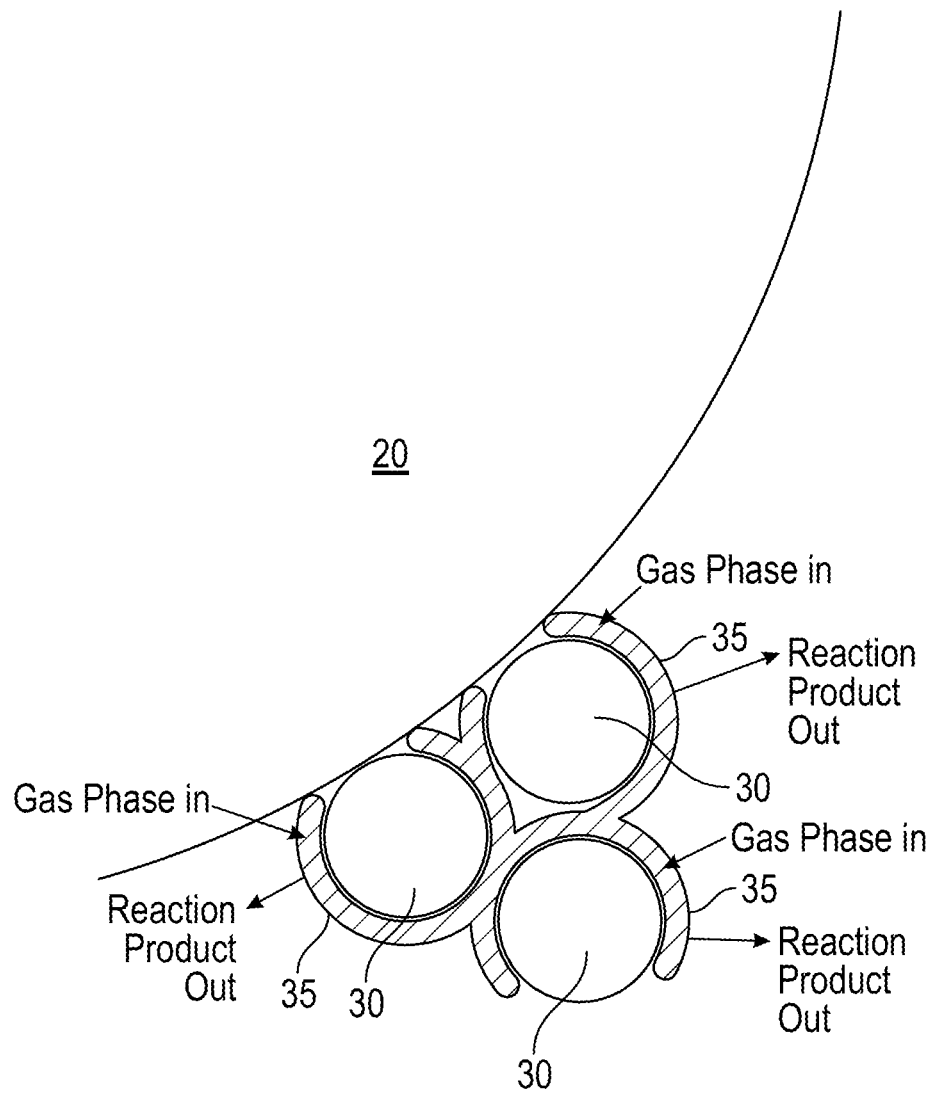
FIG. 6C is a side view of collector media and releaser media with thin film formed thereon in accordance with an illustrative embodiment of the presently disclosed subject matter.
Figure 7:
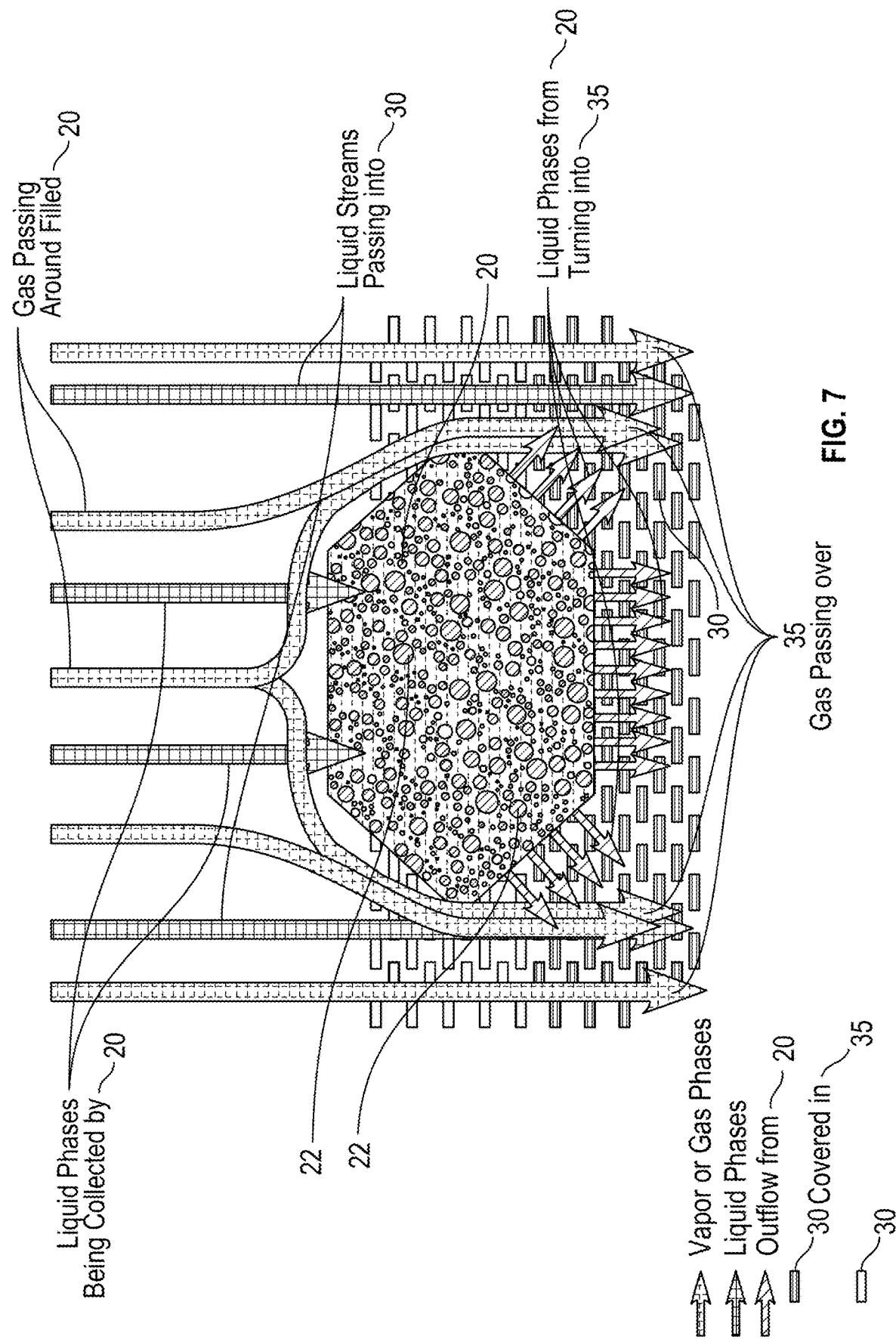
FIG. 7 is a side view of filled collector media surrounded by releaser media in accordance with an illustrative embodiment of the presently disclosed subject matter.
Figure 8:
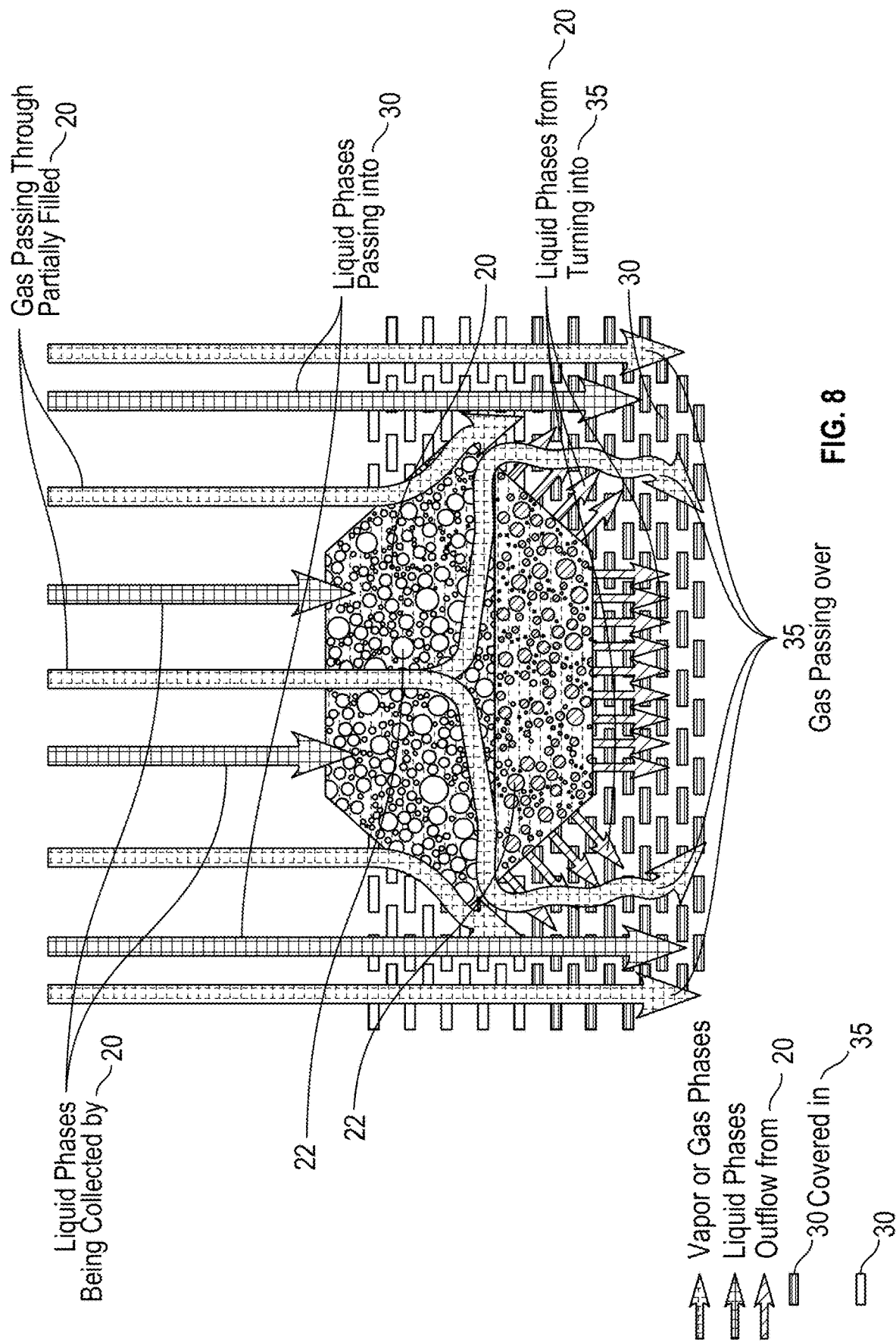
FIG. 8 is a side view of partially filled collector media surrounded by releaser media in accordance with an illustrative embodiment of the presently disclosed subject matter.

In certain illustrated embodiments, the volume flow of liquid onto releaser media 30, a high surface area solid, enables formation of a thin film 35 on an outer surface of releaser media 30, as shown in FIG. 6, which enhances the mixing of liquid in the thin film 35 and gas passing over the thin film 35. This enhanced mixing and this surface area can enables exchange of gas phase components into the liquid phase, creating reactant-rich liquid phases. This enhanced mixing and this surface area enables dissolution of undesired gas phase components out of the liquid phase, creating product-lean liquid phases. Generating this high surface area surrounding collector media 20 and enabling outflow of liquid with thin film 35 formation is a function of releaser media 30, in certain illustrative embodiments.

In certain illustrative embodiments, collector media 20 and releaser media 30 can be high geometric surface area media, including porous media. Porous media are defined as a solid with pores which enter into and/or through the media. The porous media can include reticulates, honeycomb monoliths, macro-porous materials, fissured material, agglomerates of particle packing, and fibrous mesh. These porous media can be shaped as spheres, cylinders, rings, briquettes, ellipsoids, prisms, cubes, parallelepipeds, orthotopes, saddles, wagon wheels, medallions, lobed extrudates and the like. Porous media can have surface features including asperities such as polyps, fibrils, filaments, hairs, ridges, lobes, troughs, fins, and the like. Porous media can be metallic, ceramic, polymeric or combinations of these. Porous media can be oxides, nitrides, carbides or the like.

In certain illustrative embodiments, active sites 40 can be added to releaser media 30. In certain illustrative embodiments, releaser media 30 can be elements 125. In certain illustrative embodiments, releaser media 30 can be inert. In certain illustrative embodiments, collector media 20 can be converted into elements 125 by adding active sites 40 to the collector media 20. In certain illustrative embodiments, collector media 20 can be inert.

In certain illustrative embodiments, collector media 20 are capable of containing or holding liquid phases. Collector media 20 can have individual sizes ranging between 12 and 200 millimeters. Collector media 20 can have pore pathways having diameters ranging from 1 micron to 20 millimeters. The collector media 20 internal void space, composed of the pore pathways, can make up 20% to 95% of the volume of the collector media 20. Collector media 20 can have internal void space that ranges from 100 to 6,000 square feet per cubic foot of collector media 20. Within the exchange layer 140, collector media 20 can be packed to achieve 30% to 70% packing efficiency. By controlling the pore sizes, collector media 20 can achieve up to 100% liquid collection in their internal void space. Liquid collection can be determined by multiplying the packing efficiency and the internal void space. For the packing efficiency and internal void space described, collector media 20 liquid collection can be in the range of 6%-66.5% of the exchange layer 140 volume. This range provides the ability to control liquid collection to a much greater degree. A preferred amount of liquid collection would be in the range of 20% to 66.5% of the exchange layer 140 volume, surpassing the liquid hold up of previously mentioned elements 125. This can be achieved by any combination of the packing efficiency and internal void space described.

In certain illustrative embodiments, collector media 20 can disperse liquid phases within vessel 100 to releaser media 30. For example, when the collector media 20 are completely filled with liquid, gas phase phases can bypass collector media 20. In other illustrative embodiments, the collector media 20 are partially filled with liquid, gas phases can move through collector media 20, co-current with the liquid phase.

In certain illustrative embodiments, releaser media 30 can receive liquid release from the collector media 20. Releaser media 30 can have an interstitial void space, defined by the volume consumed by pore pathways, which is permeable to the gas phase fluids. Coupled with formation of the thin film 35 as a liquid on the releaser media 30, gas flow in the interstitial void spaces can create an opportunity for a high degree of mixing and liquid-gas exchange on the thin film 35, improving gas exchange. Releaser media 30 can be equal to or smaller than the size of the collector media 20 they surround, to fit into the space created by the collector media 20. In certain illustrative embodiments, the releaser media 30 sizing would be 1/32" to 1/2". Releaser media 30 can be the same shape or a different shape than collector media 20. In certain illustrative embodiments, releaser media 30 can have as many touch points as possible for liquid release from the collector media 20 to the neighboring releaser media 30. This can be done by choosing releaser media 30 sizing small enough to increase contact points and surface area, but large enough that both liquid and gas phase are able to flow co-currently through the space surrounding the releaser media 30 and across the thin film 35 surfaces of the releaser media 30. Additionally, the shape of the releaser media 30 will influence the surface area and void space shape.

Figure 14A:
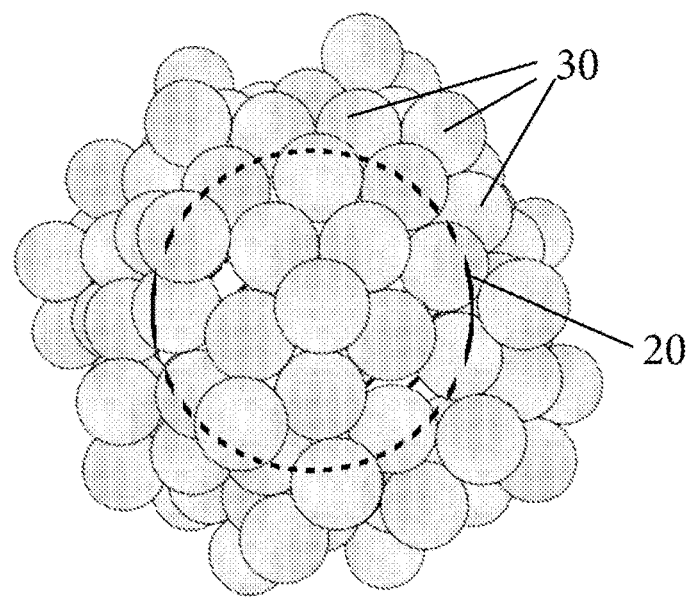
FIG. 14A is a three dimensional view of releaser media surrounding collector media in accordance with an illustrative embodiment of the presently disclosed subject matter.
Figure 14B:
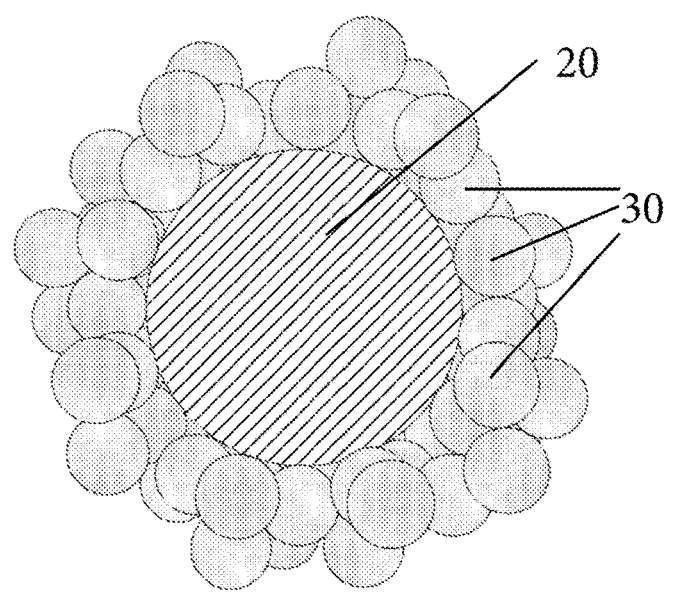
FIG. 14B is a three dimensional cross-sectional view of releaser media surrounding collector media in accordance with an illustrative embodiment of the presently disclosed subject matter.

In certain illustrative embodiments, releaser media 30 can have sizes ranging from 800 microns to 12.7 millimeters. Releaser media 30 can have geometric surface areas ranging from 60 to 1000 square feet per cubic foot of releaser media 30. Releaser media 30 can also be packed within the spaces between the larger collector media 20 so as to surround the collector media 20. Releaser media 30 can achieve a packing efficiency of >50% within the spaces surrounding the collector media 20. Contact areas between releaser media 30 and collector media 20 can act as release points to receive liquid from neighboring collector media 20. It is desirable to have packing that achieves the greatest number of releaser media 30 contact release points on the collector media 20 outer surface. In one preferred embodiment releaser media 30 can have sizing from 1/14th to 1/4th the size of collector media 20. In certain other illustrative embodiments releaser media 30 can have sizing less than 1/14th the size of collector media 20. In yet another illustrative embodiment releaser media 30 can have sizing greater than 1/4th the size of collector media 20. Also, at least twenty contact points are desired between each collector media 20 and the releaser media 30, in certain illustrative embodiments. For example, FIG. 14A is a three dimensional view and FIG. 14B is a three dimensional cross-sectional view of releaser media 30 surrounding collector media 20 in a manner that would provide at least twenty contact points therebetween. Due to the nature of low volume outflow and the described high surface area available for the liquid phase phases exiting the collector media 20, the liquid can travel along the releaser media 30 as thin films 35. Releaser media 30 have exposure to gas phases to encourage the diffusion of gas components into the liquid due to these thin films 35. During contact with the releaser media 30, the amount of gas exchanged into the thin film 35 liquid phase can be increased due to the higher rate of diffusion caused by the thin film 35 high surface area.

Collector media 20 and releaser media 30 work together in order to improve the liquid-gas interfacial surface area. For certain pore sizes within the collector media 20, liquid hold up and capillary forces can develop, providing liquid collection within the media. At maximum liquid collection, excess liquid is released from the collector media 20 to the releaser media 30 where gas exchange is provided through the releaser media 30.

Conventional element beds 120 without exchange layers 140 can provide a high surface area structure, but can lack the stability to generate sustained thin film 35 conditions. Hence, the trickle bed flow regime devolves into a low liquid-gas surface interface area, disabling high interaction between the liquid and gas phases. Disclosed collector media 20 provide void space for a high volume of liquid collection, a small pore size for a capillary force to slow liquid flow and can allow liquid accumulation, and can be permeable enough to provide organized release of liquid onto the releaser media 30.

In certain illustrative embodiments, the pore sizes of a collector media 20 are less than the size of an individual releaser media 30 to keep the releaser media 30 out of the internal structure of the collector media 20. In a preferred illustrative embodiment, collector media pore sizes are less than the void space diameter of releaser media 30 to encourage liquid collection in the collector media 20 and allow liquid outflow onto the releaser media 30.

In certain illustrative embodiments, the collector media 20 have pore volume within their bodies. The pore volume is of a pore size which is permeable to liquid phases, but is smaller than the void space diameter of the surrounding releaser media 30. As a result, collector media 20 can have a higher liquid collection capability than that of the surrounding releaser media 30. As the collector media 20 reach their maximum liquid collection, as determined by the internal void space of the collector media 20, the filled collector media 20 will release liquid in the direction of gravity. The collected liquid can be preferentially released to any downstream media (i.e., releaser media 30) which is contacting the downstream surface of the upstream media (i.e., collector media 20) at as many interface points as possible. This can create an opportunity for release of liquid to the neighboring packed bed of releaser media 30.

In certain illustrative embodiments, this releases thin films 35 with high surface area to develop on the surface of the releaser media 30. As provided by Ficks' laws, the higher surface area of the thin films 35 will enable improved transfer rate between the liquid and gas phases. As a result, desired feed stream gas components, continually depleted in the diffused liquid phase, can have an improved transfer rate into the diffused liquid phase, while reaction product gas components, which build up in the diffused liquid phase, can have an improved transfer rate out of the diffused liquid phase.

In certain illustrative embodiments, to maximize diffusion it is desirable to have high interfacial surface area between the liquid and gas phases at the interface of exchange layers 140 and element beds 120 in the vessels 100 in order to create sufficient exchange between the phases. The combined action of collector media 20 and releaser media 30 contained in an exchange layer 140 serves to provide high interfacial surface area between the liquid and gas. That high surface area provides immediate improvement of gas exchange with the diffused liquid phase within the exchange layer 140, but also permeates into the local area downstream of the exchange layer 140 providing continued ability of gas exchange with the diffused liquid phase contacted with the element bed 120. The use of exchange layers 140 can be repeated further downstream at any depth where the interfacial surface area has degraded or the dissolved gas consumption outpaces the diffusion rate of the gas phase into the liquid phase to provide regeneration of high surface area interface and exchange capability. This could lead to varying layer depths of exchange layers 140 or varying depths of element beds 120 between exchange layers 140 depending on the processing needs and conditions.

Figure 13:
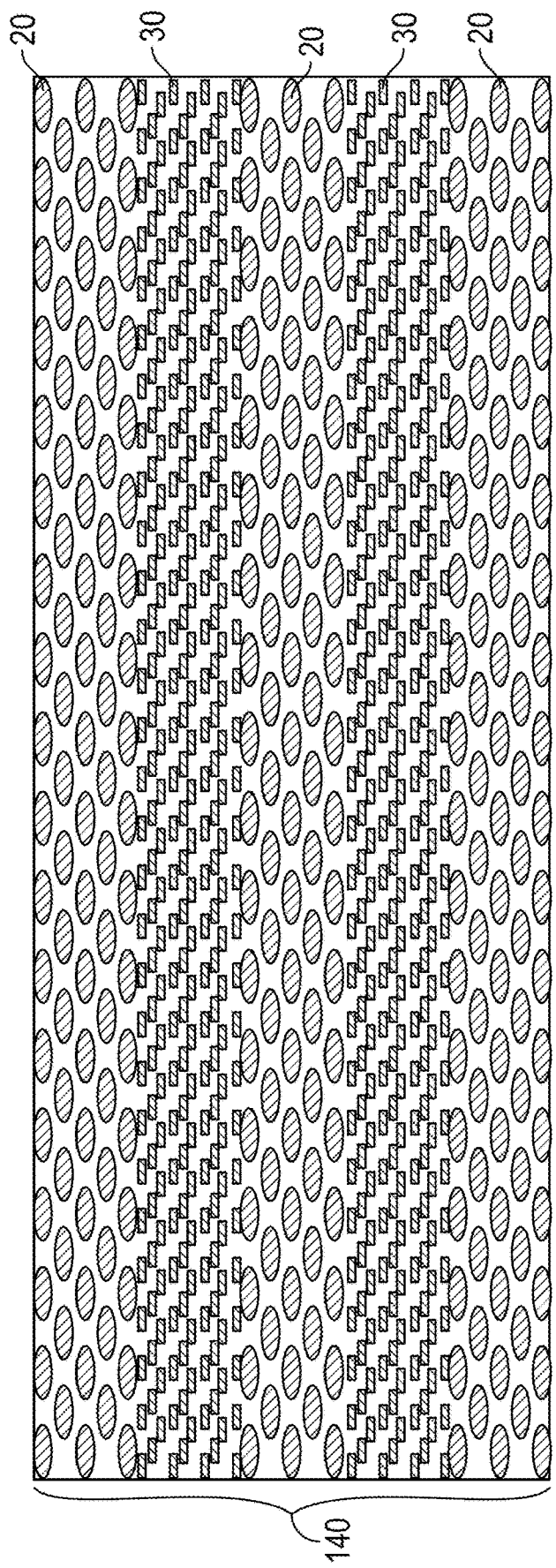
FIG. 13 is a side view of a stratified exchange layer in accordance with an illustrative embodiment of the presently disclosed subject matter.

In certain illustrative embodiments, the one or more exchange layers 140 can be composed of both collector media 20 and releaser media 30. The collector media 20 and releaser media 30 can be in alternating layers, as shown in FIG. 13, as stratified structures, or combinations thereof. In certain illustrative embodiments, the collector media 20 and releaser media 30 would fill the cross-section of the processing vessel 100 and have depths of 3" to 12".

In certain illustrative embodiments, the development of thin film 35 can be within the collector media 20 themselves. This would allow gas exchange to occur in both the collector media 20 and any surrounding releaser media 30, increasing the amount of time desirable feed steam gases would have to diffuse into the liquid and undesirable product gases would have to diffuse out of the reaction zone. The pore diameter for such collector media 20 would be between 100 microns and 30 millimeters. In this embodiment, the pore diameter of the collector media 20 can be larger than the pore diameter of the surrounding releaser media 30.

Figure 12:
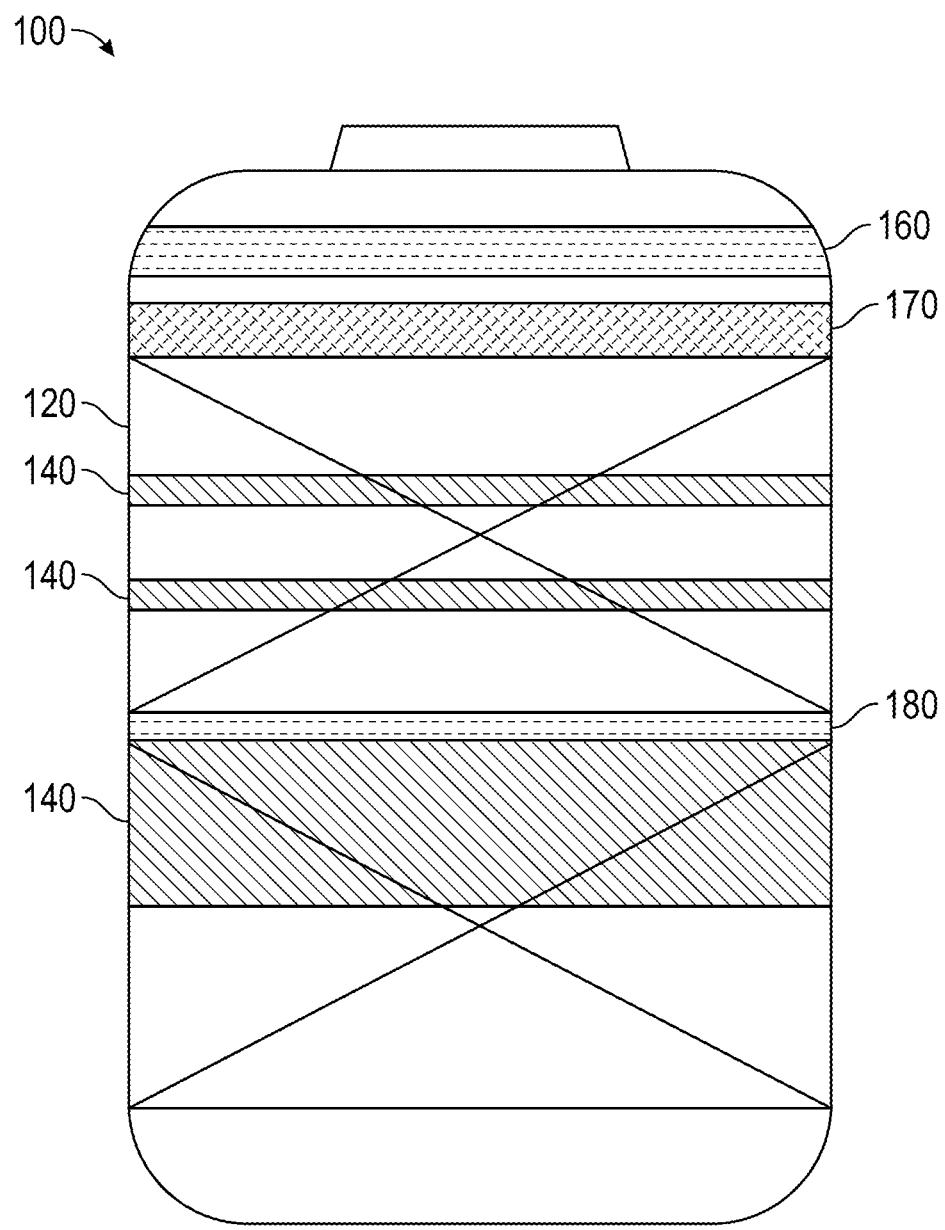
FIG. 12 is a side view of a process vessel in accordance with an illustrative embodiment of the presently disclosed subject matter.

In certain illustrative embodiments, as shown in FIG. 12, exchange layers 140 can be positioned relative to the top-bed 170 of the vessel 100 and the feed entry points. Vessel 100 can also include engineered mixer equipment 190 such as a mixer or distribution tray which can perform as designed or can under-perform in the event of faulty operation. Exchange layer 140 can be positioned immediately downstream of such engineered mixer equipment 190 and immediately upstream of the most upstream element bed 120. Exchange layers 140 can also be positioned relative to intermediate feed points 180 on vessel 100, which can be quench ports or distribution trays, typically used to supplement feed of gas phases. Exchange layer 140 positioning can be such that void spaces are provided between such equipment or bed layers.

Figure 11:
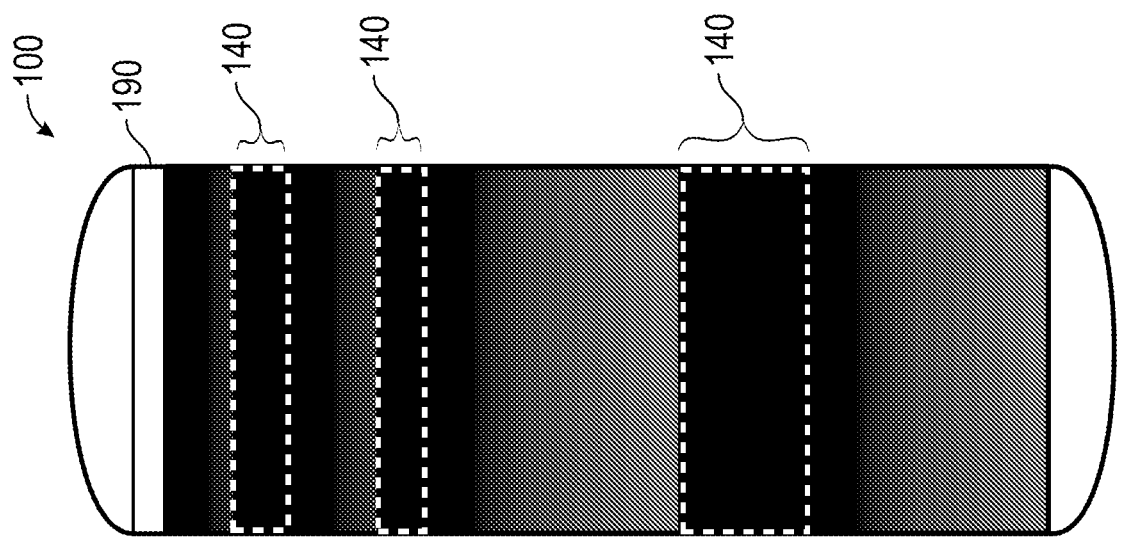
FIG. 11 is a comparison view of a prior art process vessel and a process vessel in accordance with an illustrative embodiment of the presently disclosed subject matter.
Figure 11:
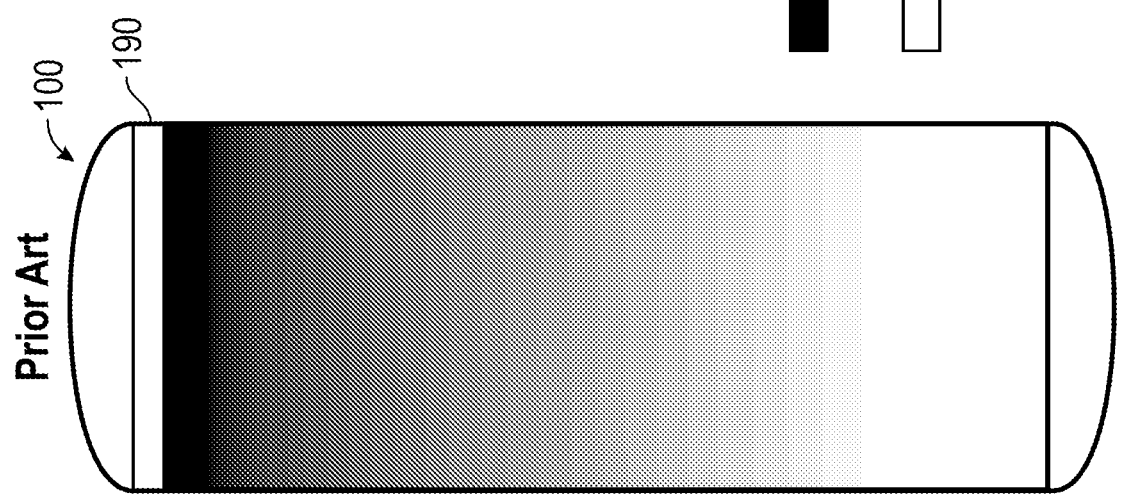

In prior art vessels, gas exchange ability can degrade in conventional trickle bed flow regimes and initial flow can be degraded as well, as illustrated in the "prior art" vessel in FIG. 11. In certain illustrative embodiments, this degradation can be mitigated via a process of collection and release to be repeated within a single exchange layer 140 within vessel 100, or by periodically repeating or strategically placing a plurality of exchange layers 140 throughout the bed or vessel 100 or to have an entire bed or vessel 100 comprised of exchange layers 140, as illustrated in the vessel 100 on the right in FIG. 11, whereby gas exchange capability is improved.

In certain illustrative embodiments, exchange layers 140 can be positioned relative to the position of elements 125 within the vessel 100. Elements 125 can be positioned downstream of the exchange layer 140. The depth of elements 125 can be from 6 inches to 90 feet depending on: the characteristics and properties of the exchange layers 140; the nature of the fluid phases; the performance of the thin film 35 in producing trickle bed flows; and the absence of coking in element bed 120.

In certain illustrative embodiments, disclosed exchange layers 140 allow elements 125 to facilitate increased performance of vessel 100 operations by promoting gas component mixing and diffusion. Improved rates of gas component exchange mean less coking and more gas components available for reaction. Additionally, due to the reactant-rich liquid phase, dispensed by the releaser media 30, the expected reaction rate between the diffused gas and undesired species contained at active sites 40 are increased, thus making better use of the element beds 120 in the vessel 100.

Exchange layers 140 could also be advantageously utilized in applications where vessels are constrained by low gas stream availability or low gas stream operating pressures or where hydrogen economics greatly favor conserved operations. Lower operating pressures result in lower exchange of gas components. As Ficks' laws demonstrate, lower concentrations will reduce the rate of gas diffusion into the liquid phase. Exchange layers 140 can improve the rate of diffusion into the liquid phase and can help conserve hydrogen circulation requirements. Higher availability of gas phase components to the diffused liquid phase allows for lower vessel 100 operating temperatures or a slowing vessel 100 temperature increase, increasing the amount of feed the active sites 40 and the vessel 100 can process, and extending the amount of time the elements 125 can be on-oil. Additionally, the processing vessel 100 can have more feed flexibility and can be able to handle a wider variety of undesired species. An advantage of such a system is the ability to arrange locations of exchange layers 140 dependent on the gas component consumption occurring on the element beds 120. For example, in a hydro-cracking unit which is consuming 2000 SCF/BBL within a total depth of 60 feet (33 SCF/BBL/FT), may require more frequent or large depth exchange layers 140 compared to a Naphtha hydro-treater which is consuming 100 SCF/BBL within a total depth of 30 feet (3.3 SCF/BBL/FT). In the hydrocracker example, exchange layers 140 can be used in conjunction with a gas quench to enable both cooling of the liquid stream and mixing of the gas and liquid simultaneously.

Figure 9:
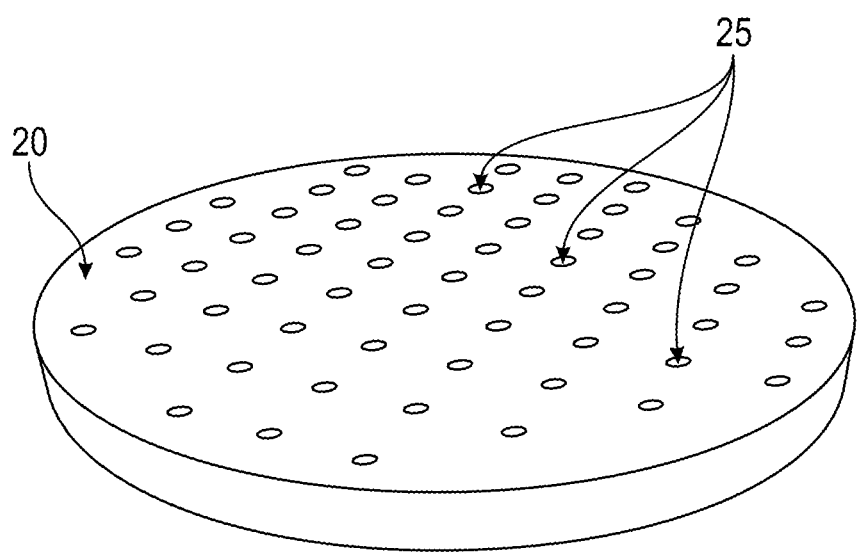
FIG. 9 is a three dimensional perspective view of a collector pane with a plurality of perforation holes in accordance with an illustrative embodiment of the presently disclosed subject matter.
Figure 10:
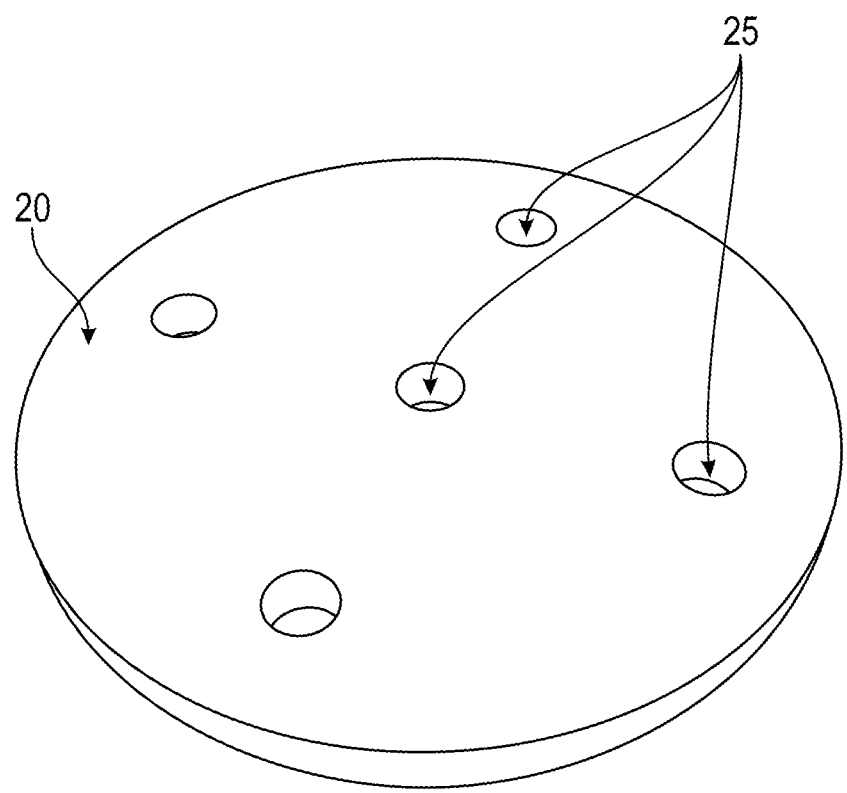
FIG. 10 is a three dimensional perspective view of a collector pane with a plurality of perforation holes in accordance with an illustrative embodiment of the presently disclosed subject matter.

In certain illustrative embodiments, the collector media 20 can be a single collector pane, as shown in FIG. 9 and FIG. 10, which fills the cross-section of the vessel 100. Additionally, this collector pane can have a plurality of perforation holes 25 formed in its cross-section in order to avoid a build-up of gas pressure on the upstream side of the collector pane. The perforation holes 25 can be filled with releaser media 30, in certain illustrative embodiments. In certain illustrative embodiments, the collector pane can be made up of a plurality of interlocking or snug-fitting parts in order to enable installation and disassembly during the loading and unloading of the vessel 100. The collector pane can be, in certain illustrative embodiments, 3" to 12" in depth. The collector pane perforation holes 25 can be, in certain illustrative embodiments ⅛" to 3 feet in diameter.

The concentration of perforation holes 25 can be from a single hole 25 across the cross-section of the vessel 100 up to one hole 25 per square inch. In certain illustrative embodiments, collector panes could be stacked on top of each other or used in a stratified collector media 20/releaser media 30 orientation as previously described herein As used herein, the phrase "at least one of" A, B and C shall mean only A, or only B, or only C, or any combination of A, B and C.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A trickle bed process vessel for treatment of a reactant-lean, product-rich liquid stream, comprising:
   an exchange layer comprising a plurality of collector media and a plurality of releaser media, wherein the exchange layer is capable of facilitating diffusion of one or more reactants from a gas phase into a reactant-lean, product-rich liquid phase within the exchange layer to form a reactant-rich, product-lean liquid phase; and
   a treatment layer downstream of the exchange layer comprising a bed of porous solid elements, the porous solid elements comprising at least one of catalysts, sorbents and reactants and capable of performing a treating process to remove an undesired species from the liquid phase,
   wherein the collector media comprise porous solid materials capable of collecting the reactant-lean liquid phase within the collector media, and wherein the releaser media comprise solid materials having a thin film formed on an outer surface thereof that is capable of facilitating contact and diffusion between the reactant-lean, product-rich liquid phase and the gas phase, and wherein the thin film is formed on the releaser media during processing as a result of liquid released from the collected liquid phase, and wherein the collector media and the releaser media are configured such that the pore sizes of the collector media are less than the size of an individual releaser media.

2. The process vessel of claim 1, wherein the releaser media comprise at least one of catalysts, sorbents and reactants.

3. The process vessel of claim 1, wherein the size of the releaser media is no more than one-fourth the size of the collector media.

4. The process vessel of claim 1, wherein the undesired species comprises at least one of sulfur, nitrogen, oxygen, aromatics, olefins, nickel, vanadium, iron, silicon or arsenic, and wherein the reactant-rich, product-lean liquid phase comprises at least one of naphtha, gasoline, kerosene, jet, diesel, gas oils, vegetable oils, animal tallow, and liquid water, and wherein the reactant diffused from the gas stream into the reactant-lean, product-rich liquid stream comprises at least one of methane, butane, propane, butalene, propylene, hydrogen, ammonia, hydrogen sulfide, carbon dioxide, carbon monoxide, sulfur oxides, nitrogen oxides, water gas, oxygen, and nitrogen.

* * * * *